(12) United States Patent
Ishii et al.

(10) Patent No.: US 11,184,597 B2
(45) Date of Patent: Nov. 23, 2021

(54) INFORMATION PROCESSING DEVICE, IMAGE GENERATION METHOD, AND HEAD-MOUNTED DISPLAY

(71) Applicant: SONY INTERACTIVE ENTERTAINMENT INC., Tokyo (JP)

(72) Inventors: Makoto Ishii, Tokyo (JP); Koichi Shiono, Tokyo (JP)

(73) Assignee: SONY INTERACTIVE ENTERTAINMENT INC., Tokyo (JP)

(*) Notice: Subject to any disclaimer, the term of this patent is extended or adjusted under 35 U.S.C. 154(b) by 145 days.

(21) Appl. No.: 16/329,918

(22) PCT Filed: Sep. 14, 2017

(86) PCT No.: PCT/JP2017/033190
§ 371 (c)(1),
(2) Date: Mar. 1, 2019

(87) PCT Pub. No.: WO2018/056155
PCT Pub. Date: Mar. 29, 2018

(65) Prior Publication Data
US 2019/0215505 A1 Jul. 11, 2019

(30) Foreign Application Priority Data
Sep. 21, 2016 (JP) .............................. JP2016-184424

(51) Int. Cl.
*H04N 13/122* (2018.01)
*H04N 13/383* (2018.01)
(Continued)

(52) U.S. Cl.
CPC ....... *H04N 13/122* (2018.05); *G02B 27/0093* (2013.01); *G02B 27/017* (2013.01);
(Continued)

(58) Field of Classification Search
CPC .......... G02B 27/017; G02B 2027/0138; G02B 2027/0187; G02B 27/0093;
(Continued)

(56) References Cited

U.S. PATENT DOCUMENTS 5,841,409 A 11/1998 Ishibashi et al.
10,133,073 B2 11/2018 Oto et al.
(Continued)

FOREIGN PATENT DOCUMENTS

JP 08-339043 A 12/1996
JP 11-341517 A 12/1999
(Continued)

OTHER PUBLICATIONS

International Search Report and Written Opinion dated Nov. 28, 2017, from International Application No. PCT/JP2017/033190, 12 sheets.
(Continued)

*Primary Examiner* — Obafemi O Sosanya
(74) *Attorney, Agent, or Firm* — Katten Muchin Rosenman LLP

(57) ABSTRACT

A motion detection section 30 detects the posture of an HMD worn on the head of a user. A status determination section 32 determines a user's gaze direction and a binocular inclination angle in accordance with the detected posture of the HMD. The binocular inclination angle is the angle between a horizontal plane and a line connecting the left and right eyes of the user. An image identification section 34 determines two images for use in the generation of left- and right-eye parallax images from a plurality of viewpoint images stored in an image storage device 16 in accordance with the user's gaze direction and the binocular inclination angle. An image generation section 36 generates left- and right-eye parallax images from the two identified images. An
(Continued)

image supply section 38 supplies the generated parallax images to the HMD.

16 Claims, 15 Drawing Sheets

(51) Int. Cl.
| | |
|---|---|
| H04N 13/332 | (2018.01) |
| H04N 13/111 | (2018.01) |
| H04N 13/156 | (2018.01) |
| G09G 5/36 | (2006.01) |
| H04N 13/344 | (2018.01) |
| H04N 13/366 | (2018.01) |
| H04N 13/20 | (2018.01) |
| H04N 13/10 | (2018.01) |
| G02B 27/00 | (2006.01) |
| G06F 3/147 | (2006.01) |
| G02B 27/01 | (2006.01) |
| G06T 19/00 | (2011.01) |
| H04N 13/00 | (2018.01) |
| G09G 5/00 | (2006.01) |

(52) U.S. Cl.
CPC .............. *G06F 3/147* (2013.01); *G06T 19/00* (2013.01); *G09G 5/00* (2013.01); *G09G 5/36* (2013.01); *H04N 13/00* (2013.01); *H04N 13/10* (2018.05); *H04N 13/111* (2018.05); *H04N 13/156* (2018.05); *H04N 13/20* (2018.05); *H04N 13/332* (2018.05); *H04N 13/344* (2018.05); *H04N 13/366* (2018.05); *H04N 13/383* (2018.05); *G02B 2027/0134* (2013.01); *G02B 2027/0138* (2013.01); *G09G 2354/00* (2013.01)

(58) Field of Classification Search
CPC .... G02B 2027/0134; G02B 2027/0198; G06F 3/011; G06F 3/012; G06F 3/013; G06F 3/014; H04N 13/117; H04N 13/344; H04N 13/00; H04N 13/111; H04N 13/10; H04N 13/106; H04N 13/122; H04N 13/366

See application file for complete search history.

(56) References Cited

U.S. PATENT DOCUMENTS

| | | | |
|---|---|---|---|
| 2004/0041822 A1* | 3/2004 | Iizuka | G06T 15/10 345/634 |
| 2004/0066449 A1 | 4/2004 | Givon | |
| 2012/0250152 A1* | 10/2012 | Larson | G02B 30/24 359/464 |
| 2013/0235169 A1* | 9/2013 | Kato | G02B 27/01 348/53 |
| 2014/0247329 A1* | 9/2014 | Nakamura | G02B 30/27 348/51 |
| 2015/0293362 A1 | 10/2015 | Takahashi et al. | |
| 2017/0118458 A1 | 4/2017 | Gronholm et al. | |
| 2017/0237963 A1* | 8/2017 | Cook | H04N 13/344 348/49 |
| 2018/0007328 A1* | 1/2018 | Kursula | H04N 9/3194 |

FOREIGN PATENT DOCUMENTS

| | | |
|---|---|---|
| JP | 2001-320732 A | 11/2001 |
| JP | 2002-354505 A | 12/2002 |
| JP | 2004-514951 A | 5/2004 |
| JP | 2010-258583 A | 11/2010 |
| JP | 2012-244453 A | 12/2012 |
| JP | 2015-95045 A | 5/2015 |
| WO | 02/44808 A2 | 6/2002 |
| WO | 2014/077046 A1 | 5/2014 |
| WO | 2015/155406 A1 | 10/2015 |

OTHER PUBLICATIONS

International Preliminary Report on Patentability dated Mar. 26, 2019, from International Application No. PCT/JP2017/033190, 21 sheets.

Notification of Reasons for Refusal dispatched Dec. 24, 2019, from Japanese Patent Application No. 2016-184424, 4 sheets.

* cited by examiner (a)

(b)

(c)

F I G . 7
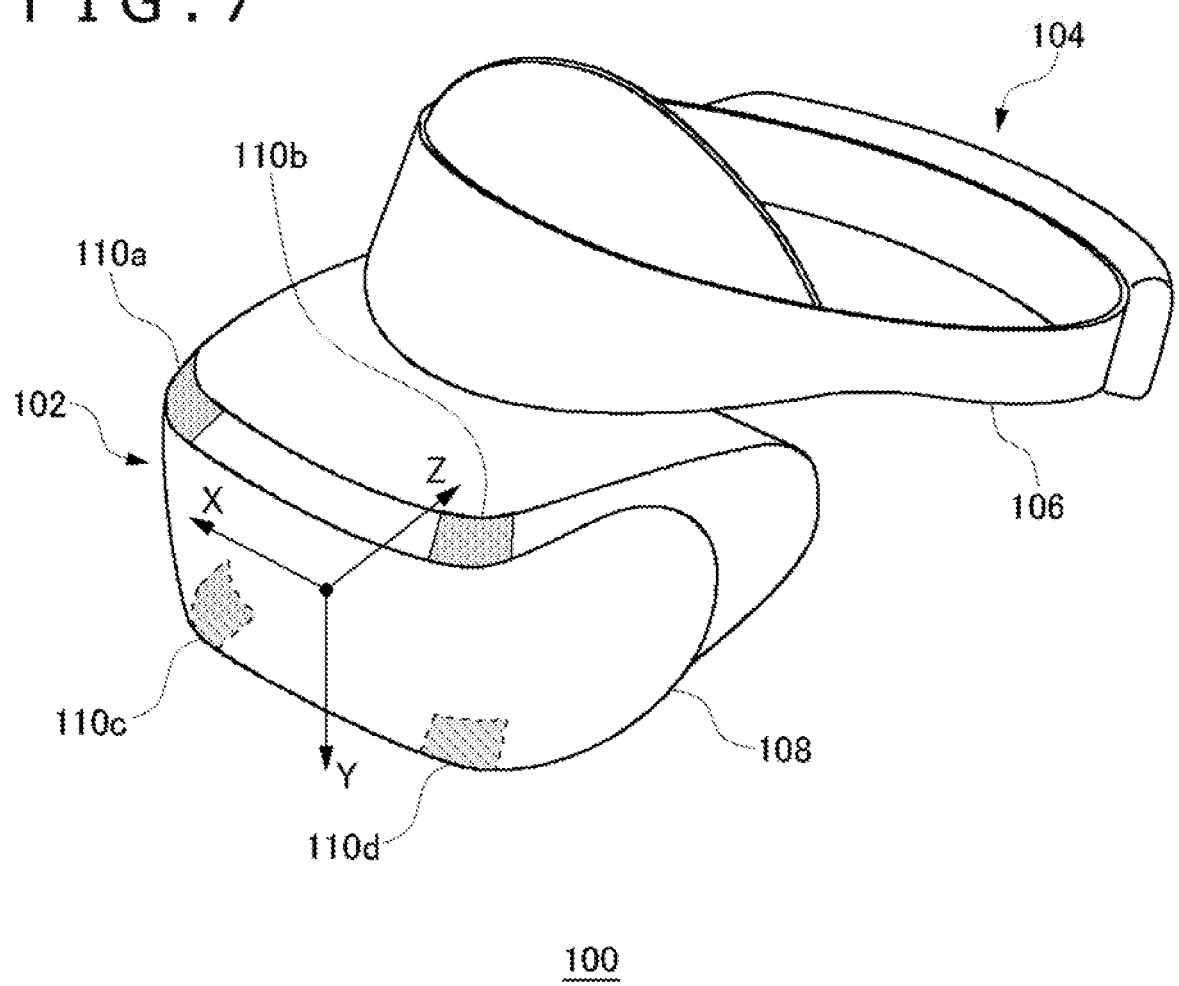

(a)

(b)

TWO-DIMENSIONAL COORDINATE PLANE

INFORMATION PROCESSING DEVICE, IMAGE GENERATION METHOD, AND HEAD-MOUNTED DISPLAY

TECHNICAL FIELD

The present invention relates to a technology for generating parallax images to be displayed on a head-mounted display and/or a technology for displaying parallax images on a head-mounted display.

BACKGROUND ART

The head-mounted display (HMD) is worn on the head of a user in order to provide a virtual reality (VR) world for the user. The sense of immersion into a video world can be enhanced by incorporating a head tracking function into the HMD and updating a display screen in conjunction with the motion of the user's head. In recent years, a technology for taking a panoramic photograph is widespread. Displaying a captured panoramic photograph image on the HMD gives the user the sense of being in a real-world place.

CITATION LIST

Patent Literature

PTL 1

JP 2015-95045A

SUMMARY

Technical Problems

The HMD includes a display panel for a user's left eye and a display panel for a user's right eye. The display panels respectively display a left-eye image and a right-eye image (parallax images) to provide stereoscopic vision. As regards a game application, a left-eye virtual camera and a right-eye virtual camera can be disposed in a game space to generate left-eye and right-eye game images and output the generated game images from the respective display panels of the HMD.

As regards a VR application that displays an actually captured object image on the HMD, a content image used as a material is generally captured by stereo cameras for displaying stereoscopic vision. When the stereo cameras are used to capture images of an object, the images are captured each time the left camera and the right camera, which are maintained in a horizontal position, are rotationally transferred by a predetermined amount in up-down direction and left-right direction from a fixed point. Therefore, when the user wearing the HMD shakes his/her head vertically or horizontally, the left and right eyes of the user are at the same horizontal height. Consequently, parallax images having a fixed parallax amount can be generated based on a stereo image material.

However, in a case where the user facing forward tilts his/her head laterally (tilts the head toward a shoulder), a line connecting the left and right eyes is inclined from a horizontal plane. Thus, the left and right eyes are not at the same horizontal height. In this case, if no material is imaged with the stereo cameras tilted at the same angle, it is difficult to generate parallax images having a fixed parallax amount. In reality, it is almost impossible to capture images of an object with the stereo cameras tilted at all angles from the horizontal plane. Therefore, if the user tilts his/her head laterally during the use of the HMD, it is impossible to provide appropriate parallax images. Under such circumstances, desired is the development of a technology for generating parallax images having a fixed parallax amount even when the user wearing the HMD tilts his/her head laterally.

The present invention has been made in view of the above circumstances. An object of the present invention is to provide a technology for properly generating parallax images to be displayed on the HMD and/or a technology for displaying parallax images.

Solution to Problems

In accomplishing the above objects, according to an aspect of the present invention, there is provided an information processing device including a detection section, a status determination section, an image identification section, an image generation section, and an image supply section. The detection section detects the posture of a head-mounted display worn on the head of a user. The status determination section determines a user's gaze direction and a binocular inclination angle in accordance with the posture of the head-mounted display, which is detected by the detection section. The binocular inclination angle is the angle between a horizontal plane and a line connecting the left and right eyes. The image identification section identifies two images used to generate left- and right-eye parallax images from a plurality of viewpoint images in accordance with the user's gaze direction and binocular inclination angle determined by the status determination section. The image generation section generates left- and right-eye parallax images from the two images identified by the image identification section. The image supply section supplies the parallax images generated by the image generation section to the head-mounted display.

According to another aspect of the present invention, there is provided the information processing device including a detection section, a status determination section, an image identification section, an image generation section, and an image supply section. The detection section detects the posture of a head-mounted display worn on the head of a user. The status determination section determines a user's gaze direction and a binocular inclination angle in accordance with the posture of the head-mounted display, which is detected by the detection section. The binocular inclination angle is the angle between a horizontal plane and a line connecting the left and right eyes. The image identification section identifies at least two images used to generate left- and right-eye parallax images from a plurality of viewpoint images in accordance with the user's gaze direction and binocular inclination angle determined by the status determination section. The plurality of viewpoint images include a plurality of viewpoint images acquired in a first gaze direction and/or a plurality of viewpoint images acquired in a second gaze direction. The image generation section generates left- and right-eye parallax images from at least two images identified by the image identification section. The image supply section supplies the parallax images generated by the image generation section to the head-mounted display.

According to still another aspect of the present invention, there is provided a head-mounted display including a left-eye display panel and a right-eye display panel. The head-mounted display further includes a control section that receives left- and right-eye image data and displays the received image data on the left-eye display panel and the right-eye display panel. The left-and right-eye image data are generated from two viewpoint images that are identified based on the gaze direction of a user wearing the head-mounted display and on a binocular inclination angle. The binocular inclination angle is the angle between a horizontal plane and a line connecting the left and right eyes of the user.

A combination of the above-mentioned elements and an expression of the present invention that are converted between, for example, methods, devices, systems, computer programs, recording media storing readable computer programs, and data structures are also effective as an aspect of the present invention.

BRIEF DESCRIPTION OF DRAWINGS

FIGS. 3(a) to 3(c) are diagrams illustrating viewpoint images captured by individual cameras of the multi-viewpoint camera.

FIGS. 3(d) and 3(e) are diagrams illustrating viewpoint images captured by individual cameras of the multi-viewpoint camera.

FIG. 7 is a diagram illustrating an exemplary external form of an HMD.

DESCRIPTION OF EMBODIMENTS

Figure 1:
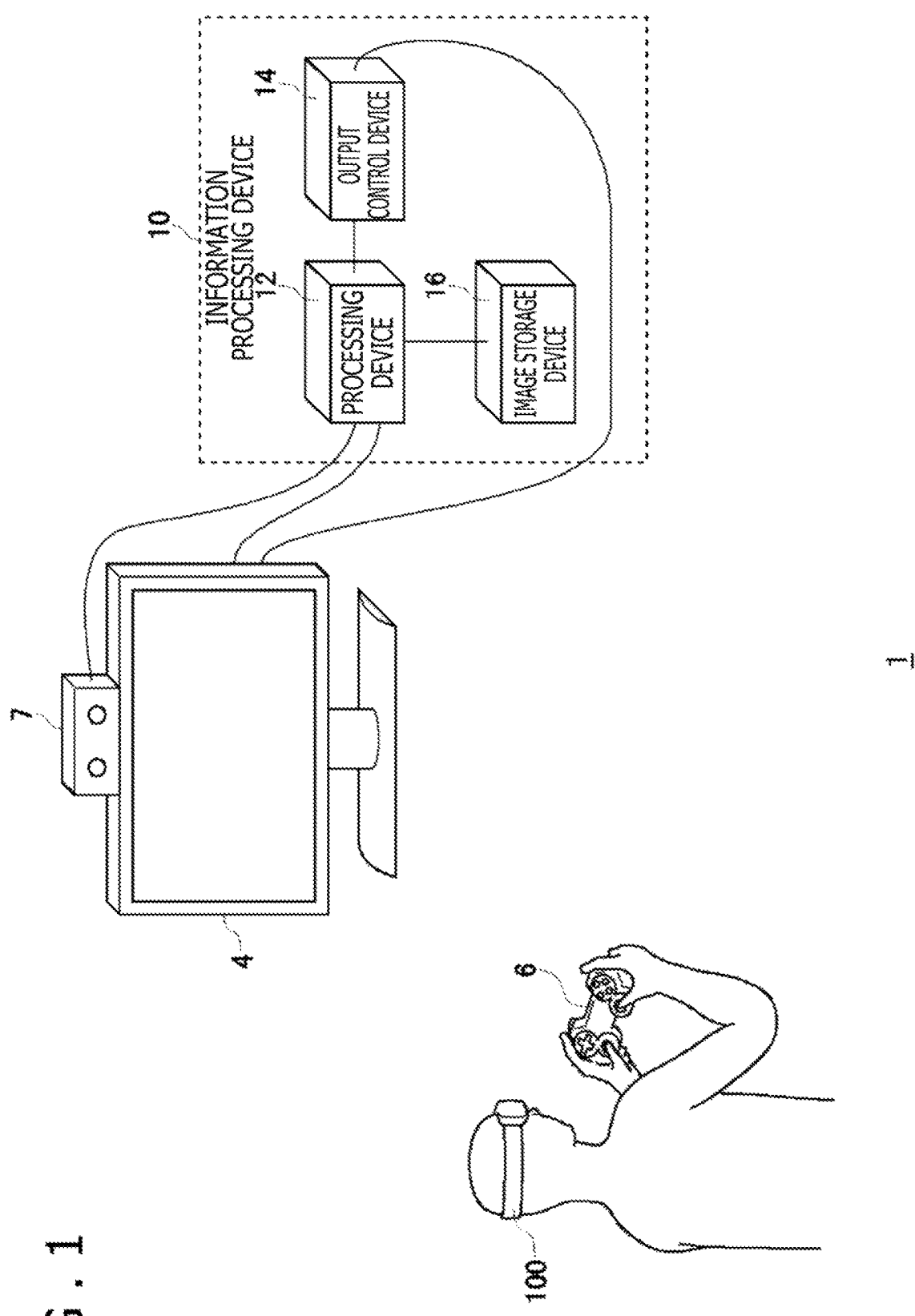
FIG. 1 is a diagram illustrating an exemplary configuration of an information processing system according to an embodiment.

FIG. 1 illustrates an exemplary configuration of an information processing system 1 according to an embodiment. The information processing system 1 includes an information processing device 10, a head-mounted display device (HMD) 100, an input device 6, an imaging device 7, and an output device 3. The HMD 100 is to be worn on the head of a user. The input device 6 is to be operated by user's fingers. The imaging device 7 captures an image of the user wearing the HMD 100. The output device 4 displays an image.

The information processing device 10 according to the embodiment includes a processing device 12, an output control device 14, and an image storage device 16. The processing device 12 is a terminal device that receives operation information from the user-operated input device 6 and executes various applications. The processing device 12 may be connected to the input device 6 by a cable or by a known wireless communication protocol. The output control device 14 is a processing unit that outputs image data generated by the processing device 12 to the HMD 100. The output control device 14 may be connected to the HD 100 by a cable or by a well-known wireless communication protocol.

The imaging device 7 is a stereo camera that captures an image of the user wearing the HMD 100 at predetermined intervals and supplies the captured image to the processing device 12. Although described in detail later, the HMD 100 is provided with markers (tracking LEDs) for tracking the head of the user, and the processing device 12 detects the motion of the HMD 100 in accordance with the position of the marker included in the captured image. It should be noted that posture sensors (acceleration sensor and gyro sensor) are mounted in the HMD 100. The processing device 12 performs a high-precision tracking process by acquiring sensor information detected by the posture sensors from the HMD 100 and using the acquired sensor information together with the captured image showing the marker. It should be noted that various methods have already been proposed for the tracking process. The processing device 12 may adopt any tracking method as far as it detects the motion of the HMD 100.

The information processing system 1 according to the embodiment executes a virtual-reality (VR) application that supplies parallax images to the HMD 100. As the user wears the HMD 100, the output device 4 is not always required for the information processing system 1. However, the output control device 14 or the processing device 12 may cause the output device 4 to output the same image as the image to be displayed on the HMD 100. Consequently, the output device 4 allows another user to view an image that the user is viewing on the HMD 100. It should be noted that images outputted from the output device 4 need not always be parallax images although the HMD 100 outputs parallax images.

The HMD 100 is a display device that is to be worn on the head of the user and is adapted to display images on display panels disposed before user's eyes. The HMD 100 displays an image for a left-eye on a left-eye display panel and displays an image for a right-eye on a right-eye display panel. The displayed images are parallax images as viewed from left and right viewpoints and adapted to provide a stereoscopic view. It should be noted that the user views the display panels through an optical lens. Therefore, the information processing device 10 obtains parallax image data by correcting optical distortion of the optical lens, and supplies the obtained parallax image data to the HMD 100. This optical distortion correction process may be performed by either the processing device 12 or the output control device 14.

In the information processing system 1, the processing device 12, the output device 4, the input device 6, and the imaging device 7 may construct a conventional game system. In such a case, the processing device 12 is a gaming device that executes a game, and the input device 6 supplies user's operation information to the processing device 12, such as a game controller, a keyboard, a mouse, or a joystick. Adding the output control device 14, the image storage device 16, and the HMD 100 to the component elements of the game system constructs the information processing system 1 that executes a VR application.

It should be noted that the functions of the output control device 14 may be incorporated into the processing device 12 as part of the functions of the VR application. That is to say, a processing unit of the information processing device 10 may merely include the processing device 12 or include the processing device 12 and the output control device 14. Subsequently, the functions of the processing device 12 and output control device 14 that are required for executing the VR application will be collectively described as the functions of the information processing device 10.

As a prerequisite for executing the VR application, a plurality of viewpoint images acquired in the same gaze direction from a plurality of viewpoint positions are stored in the image storage device 16. The information processing device 10 generates left- and right-eye parallax images by using at least two viewpoint images stored in the image storage device 16, and supplies the generated parallax images to the HMD 100.

Figure 2:
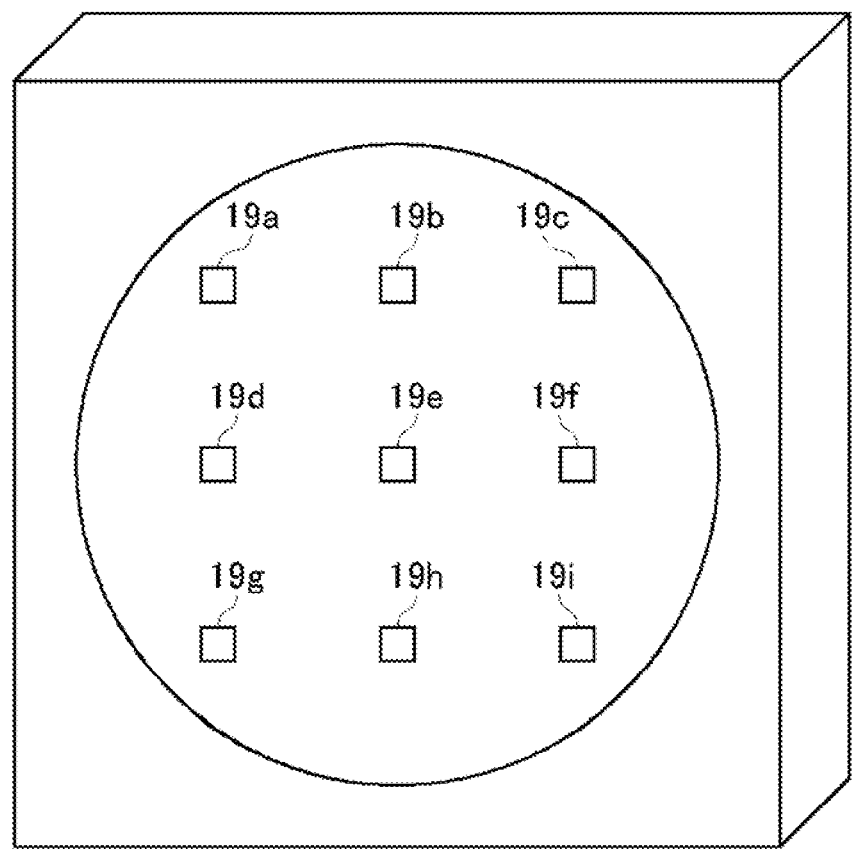
FIG. 2 is a diagram illustrating an exemplary configuration of a multi-viewpoint camera.

FIG. 2 illustrates an exemplary configuration of a multi-viewpoint camera 18. The multi-viewpoint camera 18 captures viewpoint images that are used as the materials for parallax images. The multi-viewpoint camera 18 includes a plurality of cameras 19a-19i that are arrayed in a matrix format in the same plane. In the exemplary configuration illustrated in FIG. 2, the cameras 19a-19i are arrayed at equal intervals in a three-row by three-column format. However, the cameras 19a-19i may be arrayed in a different format. When the cameras 19a-19i are not distinguished from each other, they may be generically referred to as the "cameras 19." The cameras 19 each include a solid-state image sensor such as a CMOS. (Complementary Metal Oxide Semiconductor) sensor or a CCD (Charge-Coupled Device) sensor.

The optical axis (gaze direction) of each camera 19 is set to be a direction perpendicular to the front of the multi-viewpoint camera 18. That is to say, the optical axes of the cameras 19 are set to be parallel to each other. Therefore, two adjacent cameras 19 capture images of an object in gaze directions parallel to each other so that the captured images are displaced from each other by an inter-camera distance (baseline length). As the cameras 19 simultaneously capture the images of the object, the multi-viewpoint camera 18 acquires a plurality of viewpoint images based on the viewpoint positions of the cameras 19.

The following describes the positional relationship between viewpoint images that are obtained by capturing images of a certain scene with the multi-viewpoint camera 18. FIGS. 3(a) to 3(e) depict viewpoint images 17 captured by the cameras 19. The left-right positions of the cameras 19 are defined based on a direction from the cameras 19 toward an object (i.e., the left-right positions depicted in FIG. 2 are reversed).

Figure 3A:
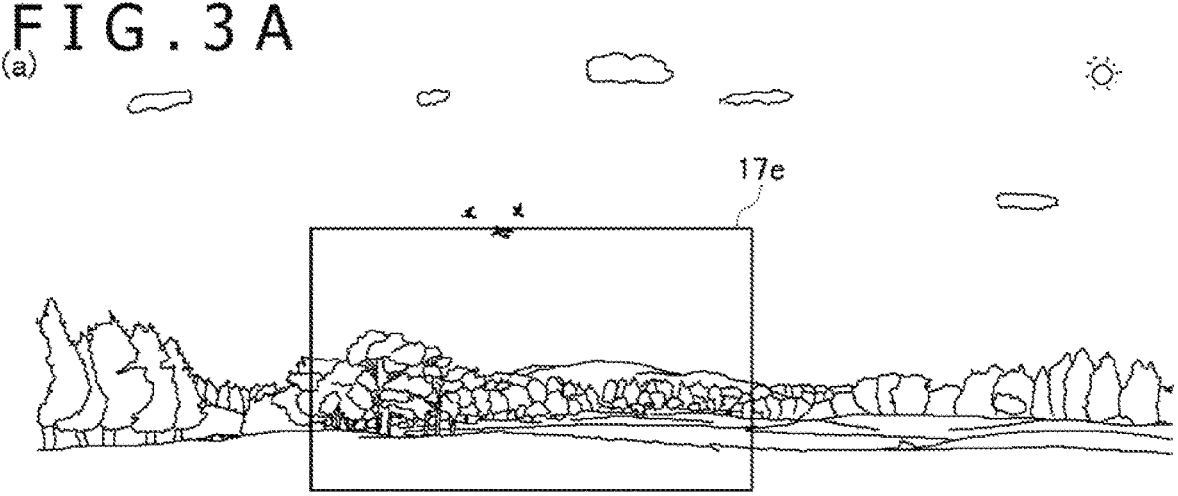
Figure 3A:
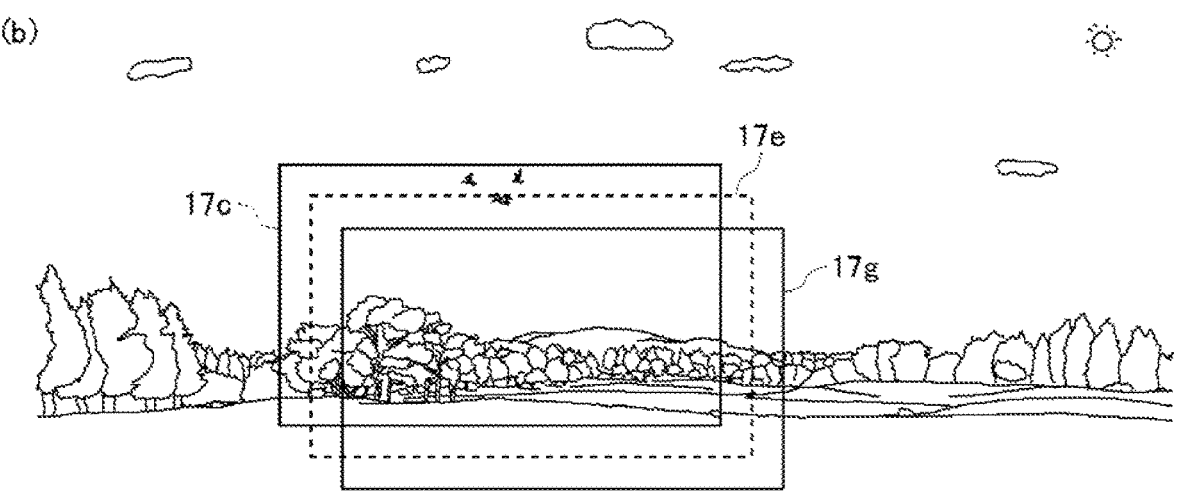
Figure 3A:
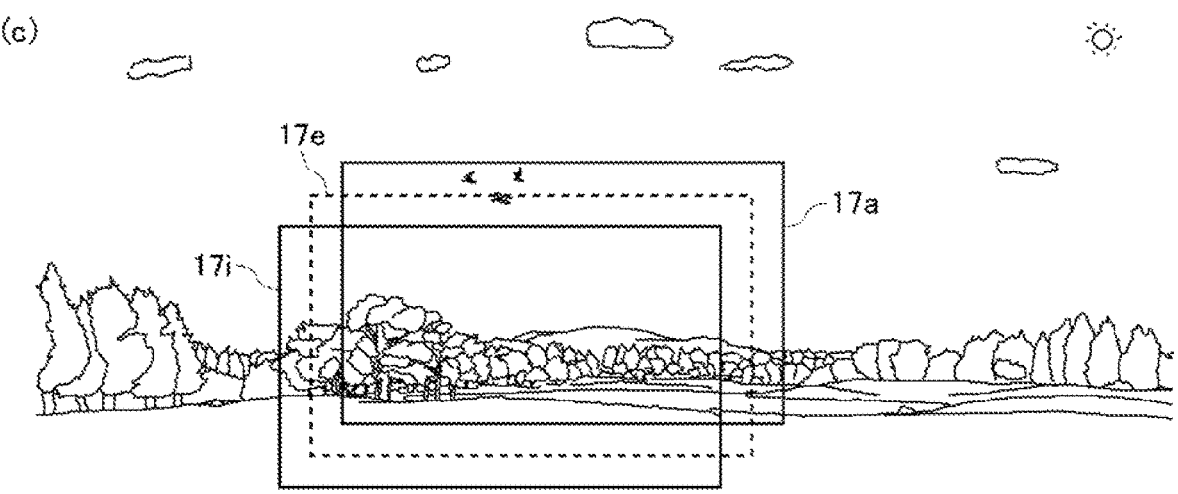

FIG. 3(a) depicts a viewpoint image 17e that is captured by a camera 19e positioned at the center of the multi-viewpoint camera 18.

Figure 3B:
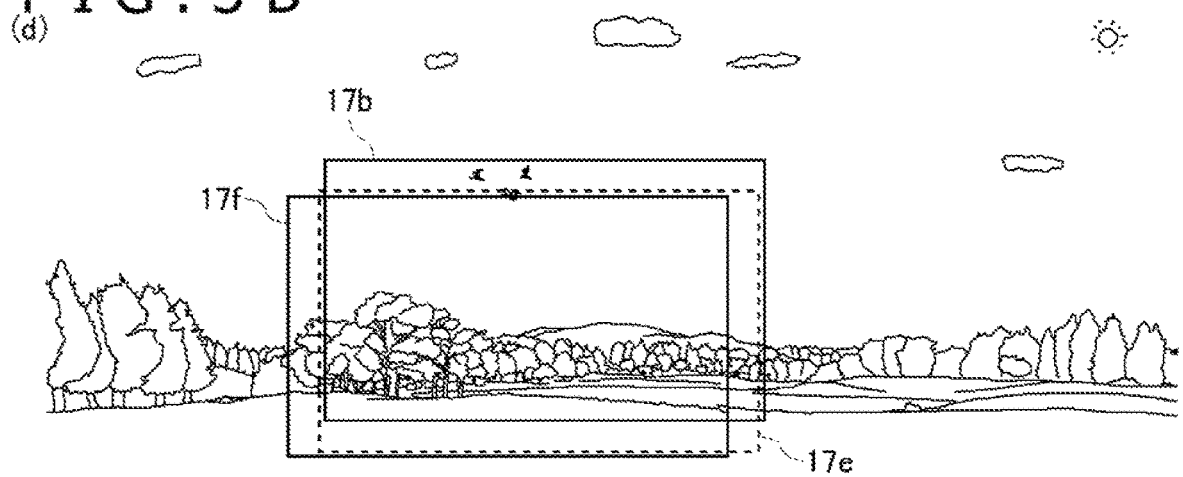
Figure 3B:
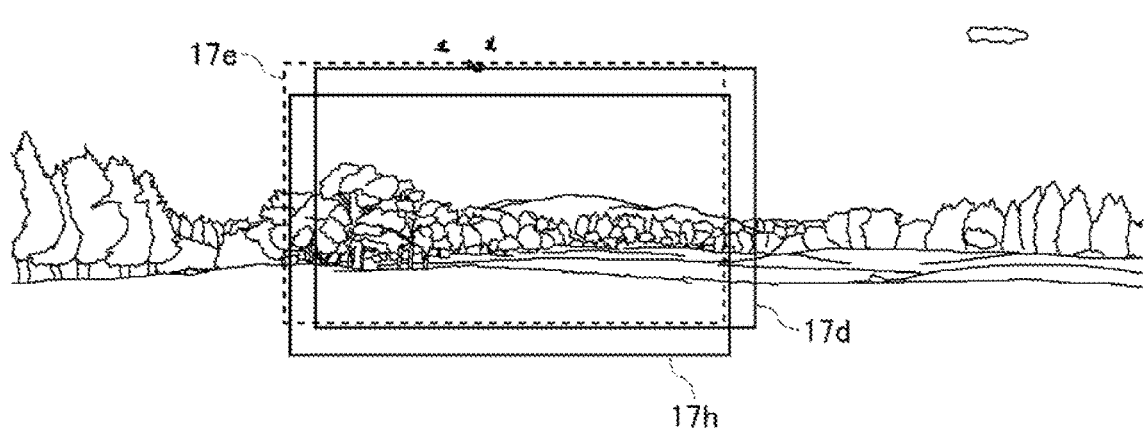

FIG. 3(b) depicts a viewpoint image 17c and a viewpoint image 17g. The viewpoint image 17c is captured by an upper left camera 19c. The viewpoint image 17g is captured by a lower right camera 19g.

FIG. 3(c) depicts a viewpoint image 17a and a viewpoint image 17i. The viewpoint image 17a is captured by an upper right camera 19a. The viewpoint image 17i is captured by a lower left camera 19i.

FIG. 3(d) depicts a viewpoint image 17b and a viewpoint image 17f. The viewpoint image 17b is captured by an upper central camera 19b. The viewpoint image 17f is captured by a left central camera 19f.

FIG. 3(e) depicts a viewpoint image 17h and a viewpoint image 17d. The viewpoint image 17h is captured by a lower central camera 19h. The viewpoint image 17d is captured by a right central camera 19d.

The multi-viewpoint camera 18 simultaneously acquires a plurality of viewpoint images 17a-17i. The distance between adjacent cameras 19 arrayed vertically or horizontally is set, for example, to 20 mm. As the optical axes of the cameras 19 are parallel to each other, images captured by different cameras 19 are as viewed in the same imaging direction (gaze direction) from different viewpoint positions. Therefore, two images captured by vertically and horizontally adjacent cameras 19 have a parallax of 20 mm.

In the embodiment, interpolated images obtained by interpolating a plurality of viewpoint images 17 captured by the multi-viewpoint camera 18 is generated in advance so that parallax images supplied to the user smoothly move in conjunction with the motion of the HMD 100 worn by the user. The interpolated images correspond to the viewpoint images that are captured from different viewpoint positions in the same gaze direction as the gaze direction of the multi-viewpoint camera 18. If the viewpoint images 17 captured by the actual cameras 19 are called "actual viewpoint images," the interpolated images generated by an interpolation process performed on at least two actual viewpoint images can be called "virtual viewpoint images." The interpolation process on the actual viewpoint images may be performed by the information processing device 10. However, such an interpolation process may alternatively be performed, for example, by an image server supplying a content image, and supplied to the information processing device 10.

Figure 4:
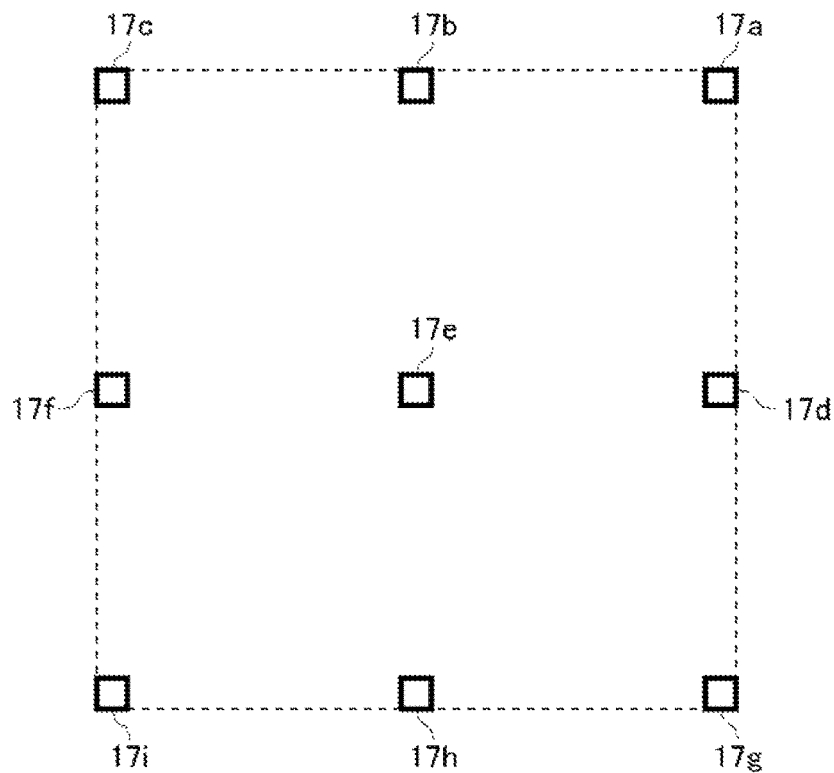
FIGS. 4(a) and 4(b) are diagrams illustrating a state where viewpoint images are disposed in a virtual two-dimensional coordinate plane.
Figure 4:
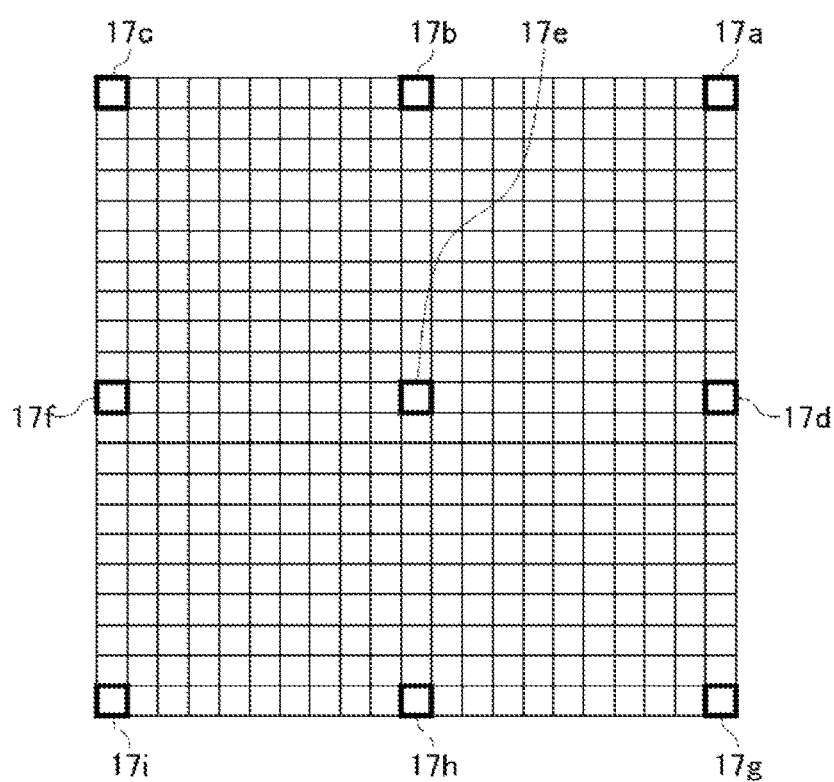

FIG. 4(a) illustrates a state where actual viewpoint images captured by the multi-viewpoint camera 18 are disposed in a virtual two-dimensional plane (two-dimensional coordinate plane). Two-dimensional coordinates indicate camera positions (viewpoint positions) at which images of an object are captured. In the embodiment, the distance (baseline length) between vertically and horizontally adjacent cameras 19 is 20 mm. Therefore, the two-dimensional coordinate plane depicted in FIG. 4(a) also indicates that the amount of parallax between vertically and horizontally adjacent viewpoint images 17 is 20 mm.

FIG. 4(b) illustrates a state where interpolated images (virtual viewpoint images) interpolating a plurality of actual viewpoint images are disposed in a virtual two-dimensional coordinate plane. Here, a plurality of virtual viewpoint images are generated between a plurality of viewpoint images 17 captured by the cameras 19 in such a manner that the amount of parallax between adjacent viewpoint images is 2 mm. FIG. 4(b) indicates that the interpolated images represented by thin lines are generated between the viewpoint images 17 represented by thick lines. Various methods for generating interpolated images have been proposed. The processing device 12 may generate the interpolated images by using a well-known algorithm. An exemplary interpolation process is described below.

First of all, based on a plurality of actual viewpoint images, the processing device 12 acquires depth information regarding an image of an object. The depth information is acquired, for example, by performing a stereo matching process. A difference (parallax) based on the distance to the object exists between two-dimensional images captured from two viewpoints. Stereo matching is a method of determining three-dimensional depth information by using the above-mentioned difference. Based on a plurality of actual viewpoint images and the depth information, the processing device 12 generates a plurality of interpolated images between the actual viewpoint images, and stores the generated interpolated images in the image storage device 16.

Interpolated images in an upper right area surrounded by viewpoint images 17a, 17b, 17e, and 17d will now be described. Nine virtual viewpoint images acquired by laterally moving the viewpoint position 2 mm at a time are generated between the viewpoint image 17a and the viewpoint image 17b. Further, nine virtual viewpoint images acquired by laterally moving the viewpoint position 2 mm at a time are generated between the viewpoint image 17d and the viewpoint image 17e. As a result, eleven viewpoint images are lined up beginning with the viewpoint image 17a and ending with the viewpoint image 17b, and eleven viewpoint images are lined up beginning with the viewpoint image 17d and ending with the viewpoint image 17e. The viewpoint position is then vertically moved 2 mm at a time between the above-mentioned viewpoint images to acquire virtual viewpoint images. In this manner, nine virtual viewpoint images are generated for each column. As a result, multi-viewpoint images are formed in the upper right area in such a manner that the amount of parallax between vertically and horizontally adjacent viewpoint images is 2 mm. When the similar interpolation process is performed on the other areas, a group of 441 (21 columns by 21 rows) viewpoint images is generated.

In the image storage device 16, each viewpoint image is stored in association with its viewpoint position. The viewpoint positions are set as coordinate values of virtual two-dimensional coordinates, and the coordinate values are used to calculate an actual distance.

Figure 5:
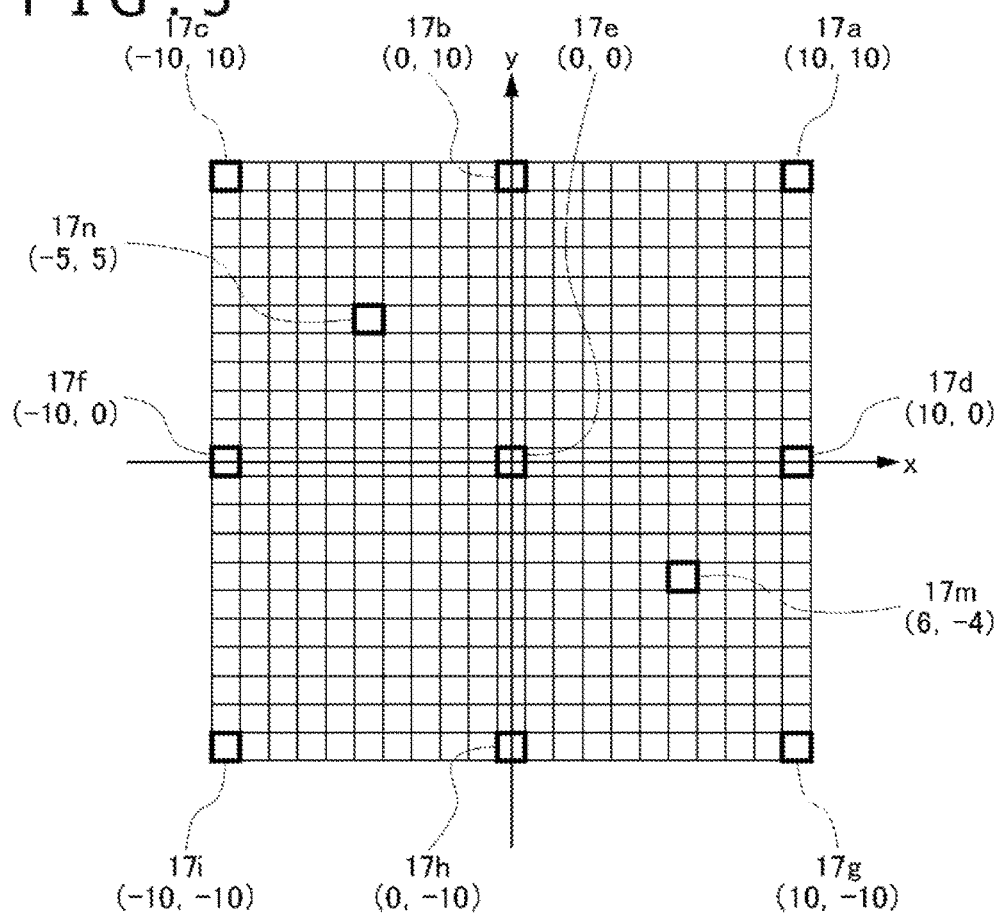
FIG. 5 is a diagram illustrating exemplary coordinate values of viewpoint positions associated with viewpoint images.

FIG. 5 illustrates exemplary coordinate values of viewpoint positions associated with viewpoint images. In the two-dimensional coordinate plane depicted in FIG. 5, for the sake of convenience, the viewpoint position for the viewpoint image 17e is set as the origin (0,0). In this instance, the viewpoint position for the viewpoint image 17a is expressed as (10,10), and the viewpoint position for the viewpoint image 17h is expressed as (0, −10). The similar holds for interpolated viewpoint images 17. The viewpoint position for the viewpoint image 17m is expressed as (6, −4), and the viewpoint position for the viewpoint image 17n is expressed as (−5,5). In the above-mentioned two-dimensional coordinates, one division (one coordinate value) of the x- and y-axes corresponds to 2 mm. Therefore, if two viewpoint positions are (x1,y1) and (x2,y2), respectively, the distance between the two viewpoint positions is expressed by Equation (1) below.

$$\sqrt{(x1-x2)^2+(y1-y2)^2} \times 2 \text{ mm} \qquad [\text{Math1}]$$

It should be noted that the above method of expressing viewpoint positions in the two-dimensional coordinate plane is merely an example. The viewpoint positions may be managed in any manner as far as the distance between two viewpoint positions can be calculated.

Multi-viewpoint images whose amount of parallax between vertically and horizontally adjacent viewpoint images is 2 mm may be generated by performing an interpolation process. However, such multi-viewpoint images may alternatively be acquired by actually capturing images. For example, a single camera 19 may be moved 2 mm at a time in the same gaze direction within the range of 40 mm vertically and 40 mm horizontally, and an image capturing operation may be performed each time the camera is moved to acquire a total of 441 viewpoint images whose amount of parallax between adjacent viewpoint images is 2 mm. Further, a plurality of multi-viewpoint images may be acquired in such a manner that the acquired images are spatially contiguous in a transverse direction, and then stored in the storage device 16. A left-right, all-around panoramic image is formed by joining different multi-viewpoint images.

Based on a user's gaze direction determined from the posture of the HMD 100 worn on the head of the user and a binocular inclination that is the angle between a horizontal plane and a line connecting the left and right eyes of the user, the information processing device 10 according to the embodiment causes the HMD 100 to display appropriate parallax images. Further, the information processing device 10 may generate parallax images based on a user's viewpoint position determined from the position of the HMD 100.

Figure 6:
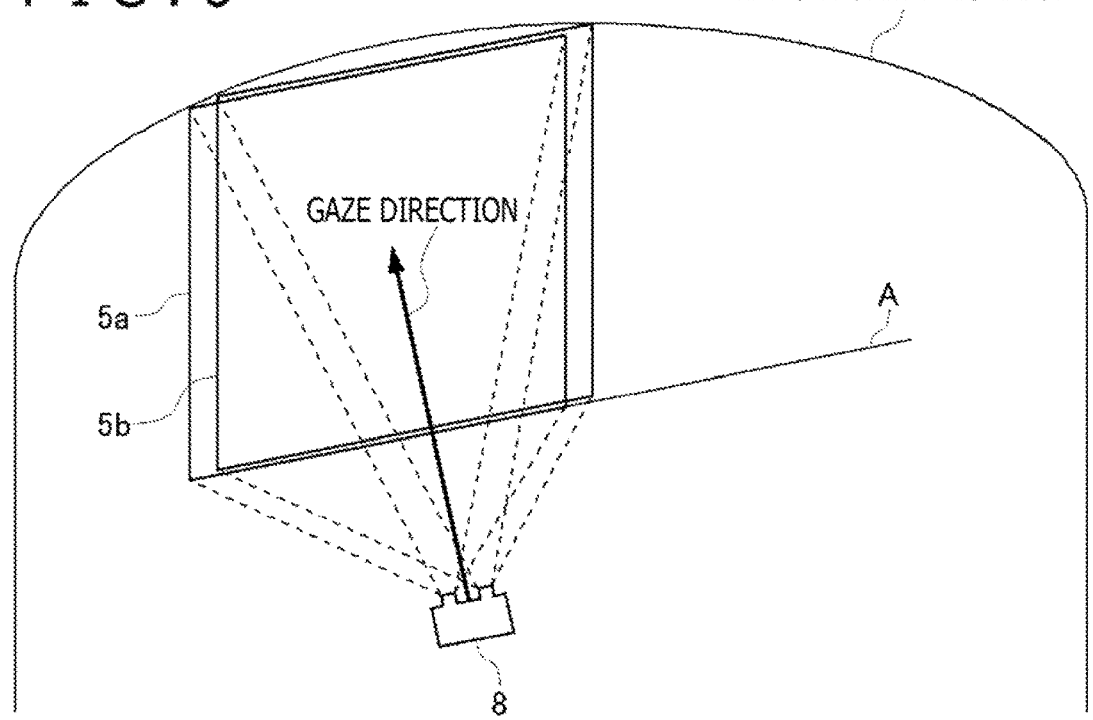
FIG. 6 is a diagram illustrating parallax images.

FIG. 6 is a diagram illustrating parallax images generated in the information processing device 10. The VR application according to the embodiment assumes that the image storage device 16 stores multi-viewpoint images acquired with a direction (horizontal direction) parallel to the horizontal plane set as the imaging direction (gaze direction), and that the user views, through the HMD 100, the parallax images in a gaze direction parallel to the horizontal plane. It should be noted that the above conditions are merely mentioned to facilitate understanding. As described later, the gaze direction of the multi-viewpoint camera 18 for acquiring multi-viewpoint images and the gaze direction of the user wearing the HMD 100 are not limited to the horizontal direction.

The image storage device 16 stores laterally contiguous different multi-viewpoint images in association with their respective gaze directions. Here, the term "contiguous" signifies that all existing objects are imaged from a 360-degree circumference. In the embodiment, the different multi-viewpoint images are generated based on a plurality of viewpoint images that are captured each time the angle of the multi-viewpoint camera 18 from the horizontal plane is shifted by a predetermined angle of β around a predetermined position. The VR application according to the embodiment enables the user to enjoy content images around himself/herself when the user moves his/her face while facing towards the horizontal direction.

When a user's face moves to change the gaze direction and the binocular inclination angle, which is the angle between the horizontal plane and the line connecting the left and right eyes of the user, the gaze direction of a virtual camera 8 and the tilt of the left and right cameras are changed to update a left-eye image 5a and a right-eye image 5b that are supplied to the HMD 100.

As indicated in FIG. 6, viewpoint images serving as image materials may be attached to the inner circumferential surface of a virtual cylindrical body. When a plurality of viewpoint images are virtually disposed on the inner surface of the cylindrical body in a contiguous manner (with no gaps), a panoramic image in the VR application is formed. Consequently, a more real video world can be provided to the user.

The information processing device 10 detects the position coordinates and posture of a user's head (actually the HMD 100) by performing a head tracking process on the user.

Here, the position coordinates of the HMD 100 are position coordinates in a three-dimensional space where a reference position is used as the origin. Position coordinates achieved when the HMD 100 is turned on may be set as the reference position. Further, the posture of the HMD 100 is the inclination of a three-axis direction from a reference posture in the three-dimensional space. The reference posture is such that the binocular inclination angle, which is the angle between the horizontal plane and the line connecting the left and right eyes, is zero (i.e., the left and right eyes are at the same height), and that the user's gaze direction is the horizontal direction. The reference posture may be set when the HMD 100 is turned on.

A well-known technology may be used for the head tracking process. The information processing device 10 is able to detect the position coordinates and posture of the HMD 100 from only the sensor information detected by the posture sensors of the HMD 100, and is further able to detect the position coordinates and posture of the HMD 100 with high precision by performing an image analysis process on the markers (tracking LEDs) of the HMD 100, which are imaged by the imaging device 7.

In accordance with the detected position coordinates and posture of the HMD 100, the information processing device 10 determines the position and posture of the virtual camera 8 in the virtual cylindrical body. The virtual camera 8 is a stereo camera and disposed to capture an image of the inner circumferential surface of the virtual cylindrical body from the inside of the virtual cylindrical body. It should be noted that the position coordinates of the HMD 100 specify the position of the virtual camera 8 in the virtual cylindrical body, and that the posture of the HMD 100 specifies the posture of the virtual camera 8 in the virtual cylindrical body.

The relationship between the posture of the HMD 100 and the posture of the virtual camera 8 will now be described. The information processing device 10 causes the posture of the virtual camera 8 to coincide with the detected posture of the HMD 100. The left camera in the virtual camera 8 virtually captures the left-eye image 5a, and the right camera in the virtual camera 8 virtually captures the right-eye image 5b. The left-eye image 5a and the right-eye image 5b are displaced from each other by the distance (baseline length) between the right camera and the left camera. The amount of this displacement forms a parallax.

The baseline length in the virtual camera 8 determines the amount of parallax between the left-eye image 5a and the right-eye image 5b. Therefore, it is preferable that the baseline length in the virtual camera 8 be user-changeable as needed. The amount of parallax needs to be increased to produce an enhanced stereoscopic effect. However, an increase in the amount of parallax may give some users an uncomfortable feeling or viewing fatigue. It is generally said that the distance between the left and right eyes of a human adult is approximately 65 mm. However, if the amount of parallax between the left-eye image 5a and the right-eye image 5b is set to 65 mm in the HMD 100 for experiment purposes, it is found that images are extremely difficult to view. In view of such circumstances, the embodiment sets the baseline length of the virtual camera 8 to 20 mm by default, and allows the user to change the baseline length of the virtual camera 8 to a desired value before or after the start of the VR application.

FIG. 7 illustrates an exemplary external form of the HMD 100. The HMD 100 includes an output mechanism section 102 and a mounting mechanism section 104. The mounting mechanism section 104 includes a mounting band 106 that fastens the HMD 100 to the whole circumference of the user's head when the user wears the HMD 100. The mounting band 106 has a material or structure that enables the user to adjust the length of the mounting band 106 until it fits on the circumference of the user's head.

The output mechanism section 102 includes a housing 108 and a display panel. The housing 108 is shaped so as to cover the left and right eyes of the user when the user wears the HMD 100. The display panel is disposed inside the housing 108 and adapted to face the eyes of the user when the user wears the HMD 100. The display panel may be, for example, a liquid-crystal panel or an organic EL panel. A left and right pair of optical lenses are further disposed in the housing 108. The optical lenses are positioned between the display panel and the user's eyes to increase the viewing angle of the user. The HMD 100 may further include speakers and earphones that are positioned to match user's ears.

Light-emitting markers 110a, 110b, 110c, 110d are attached to the outer surface of the housing 108. In the present example, the tracking LEDs are used as the light-emitting markers 110. However, different types of markers may alternatively be used. Any markers may be used as far as they can be imaged by the imaging device 7 and their positions can be subjected to image analysis by the information processing device 10. The number of light-emitting markers 110 and their positions are not particularly limited. However, an adequate number of light-emitting markers 110 need to be properly disposed to detect the posture of the HMD 100. In the example depicted in FIG. 7, the light-emitting markers 110 are disposed at four front corners of the housing 108. Further, the light-emitting markers 110 may be disposed on the sides and rear of the mounting band 106 in order to capture an image even when the back of the user faces the imaging device 7.

The HMD 100 may be connected to the information processing device 10 by a cable or by a well-known wireless communication protocol. The HMD 100 transmits sensor information detected by the posture sensors to the information processing device 10, and receives the parallax image data generated by the information processing device 10 in order to display the parallax image data on the left-eye display panel and the right-eye display panel.

Figure 8:
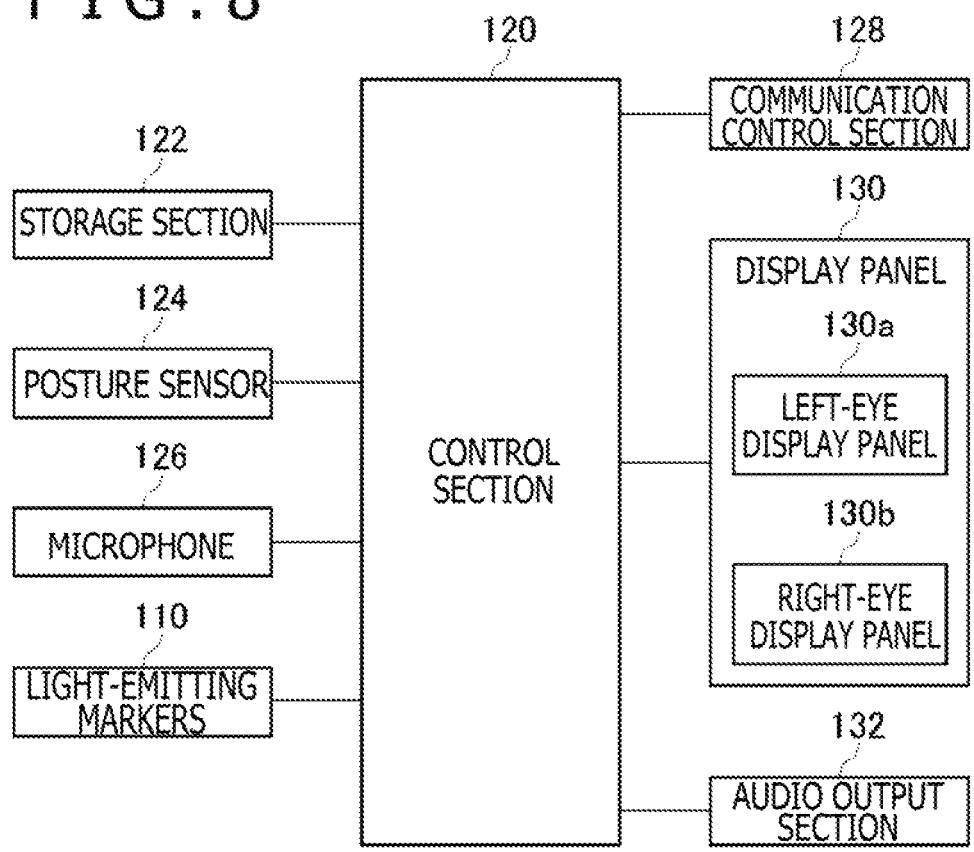
FIG. 8 is a diagram illustrating the functional blocks of the HMD.

FIG. 8 illustrates the functional blocks of the HMD 100. A control section 120 is a main processor that processes commands and various data, such as image data, audio data, and sensor information, and outputs the result of processing. A storage section 122 temporarily stores, for example, data and commands to be processed by the control section 120. A posture sensor 124 detects posture information regarding the HMD 100. The posture sensor 124 includes at least a three-axis acceleration sensor and a three-axis gyro sensor.

For the HMD 100, XYZ three-dimensional coordinates are set as depicted in FIG. 7. Here, a pitch axis, a yaw axis, and a roll axis are set as the X-axis, the Y-axis, and the Z-axis, respectively. A first acceleration sensor detects the acceleration in the pitch axis direction, and a first gyro sensor detects the angular velocity around the pitch axis. A second acceleration sensor detects the acceleration in the yaw axis direction, and a second gyro sensor detects the angular velocity around the yaw axis. A third acceleration sensor detects the acceleration in the roll axis direction, and a third gyro sensor detects the angular velocity around the roll axis.

A communication control section 128 establishes wired or wireless communication through a network adapter or an antenna, and transmits data outputted from the control section 120 to the external information processing device 10. Further, the communication control section 128 establishes wired or wireless communication through the network adapter or the antenna, receives data from the information processing device 10, and outputs the received data to the control section 120.

Upon receiving video data and audio data from the information processing device 10, the control section 120 supplies the received video data to a display panel 130 for the purpose of display, and supplies the received audio data to an audio output section 132 for the purpose of audio output. The display panel 130 includes a left-eye display panel 130a and a right-eye display panel 130b. The left- and right-eye display panels display a pair of parallax images having a predetermined parallax amount. Further, the control section 120 causes the communication control section 128 to transmit sensor information received from the posture sensor 124 and audio data received from a microphone 126 to the information processing section 10.

Figure 9:
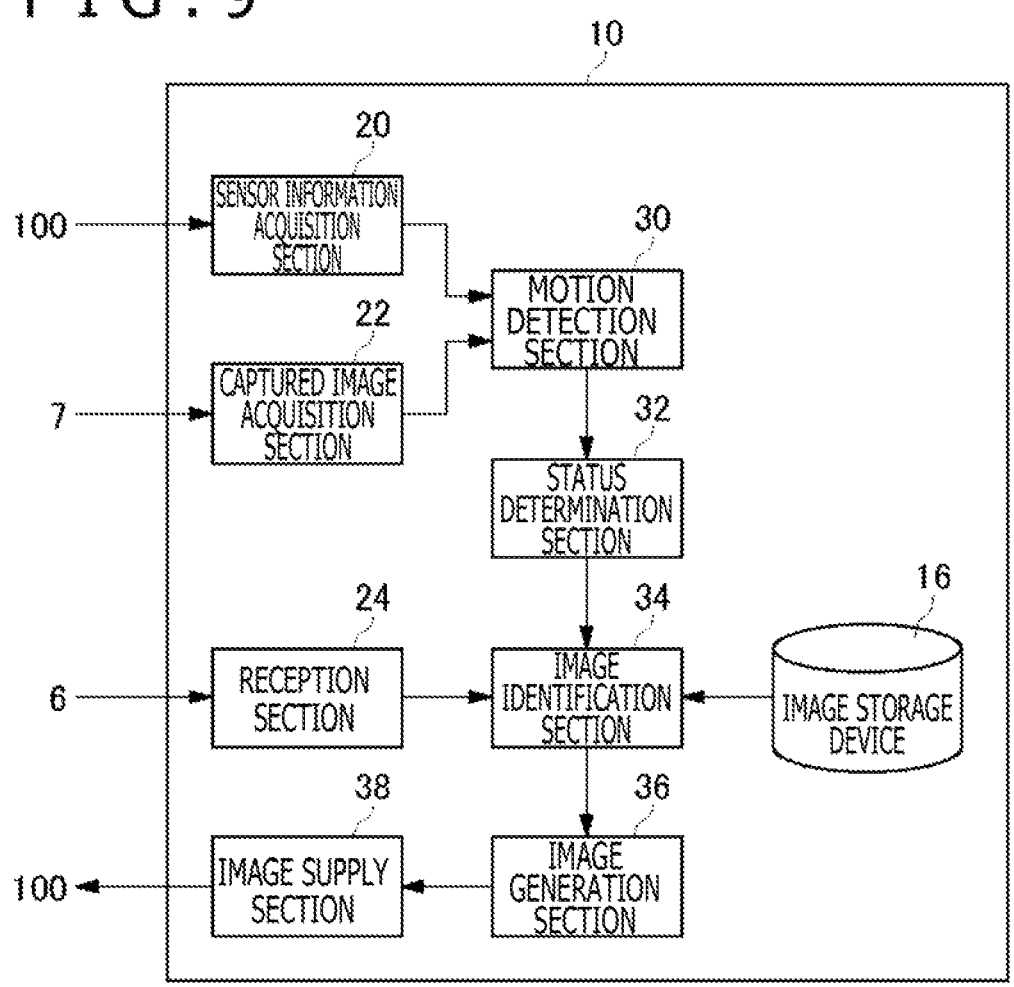
FIG. 9 is a diagram illustrating the functional blocks of an information processing device.

FIG. 9 illustrates the functional blocks of the information processing device 10. As input/output interfaces to the outside, the information processing device 10 includes a sensor information acquisition section 20, a captured image acquisition section 22, a reception section 24, and an image supply section 38. The sensor information acquisition section 20 acquires sensor information at predetermined intervals from the posture sensor 124 of the HMD 100. The captured image acquisition section 22 acquires a captured image of the HMD 100 at predetermined intervals from the imaging device 7. For example, the imaging device 7 captures an image of a forward space at 1/60-second intervals, and the captured image acquisition section 22 acquires a captured image at 1/60-second intervals. The reception section 24 acquires user-inputted information from the input device 6.

The information processing device 10 further includes a motion detection section 30, a status determination section 32, an image identification section 34, and an image generation section 36. The motion detection section 30 detects the position coordinates and posture of the HMD 100 in accordance with the motion of the HMD 100 worn on the head of the user. The status determination section 32 determines the user's viewpoint position in accordance with the position coordinates of the HMD 100, which is detected by the motion detection section 30, and determines the user's gaze direction and the binocular inclination angle, which is the angle between the horizontal plane and the line connecting the left and right eyes of the user, in accordance with the posture of the HMD 100.

From a plurality of parallax images stored in the image storage device 16, the image identification section 34 identifies two images for use in the generation of left-and right-eye parallax images. In this instance, based on at least the user's gaze direction and binocular inclination angle determined by the status determination section 32, the image identification section 34 identifies the two images for use in the generation of the parallax images. For the sake of convenience, the embodiment assumes that the user's gaze direction is parallel to the horizontal plane. The image generation section 36 generates the left- and right-eye parallax images from the two images identified by the image identification section 34. The image supply section 38 supplies the parallax images generated by the image generation section 36 to the HMD 100.

Referring to FIG. 9, individual elements depicted as the functional blocks for performing various processes may be formed by hardware, such as a circuit block, a memory, or an LSI, and implemented by software, such as a program loaded into a memory. Therefore, it will be understood by those skilled in the art that the functional blocks may be variously implemented by hardware only, by software only, or by a combination of hardware and software. The method of implementing the functional blocks is not specifically limited.

The image storage device 16 stores a plurality of viewpoint images acquired from a plurality of viewpoint positions in association with coordinate values indicative of viewpoint positions in two-dimensional coordinates. The virtual two-dimensional coordinate plane is set for each of the multi-viewpoint images simultaneously captured by the multi-viewpoint camera 18. In the embodiment, the multi-viewpoint camera 18 performs an object imaging operation by changing the angle in the horizontal plane around a predetermined position by a predetermined angle of $\beta$ at a time while maintaining a horizontal gaze direction of the multi-viewpoint camera 18. If, for example, the predetermined angle of $\beta$ is 0.1 degrees, 3600 different multi-viewpoint images are generated when a total of 3600 imaging operations are performed while the multi-viewpoint camera 18 is rotated by 0.1 degrees at a time. Further, if, for example, the predetermined angle of $\beta$ is 10 degrees, 36 different multi-viewpoint images are generated when a total of 36 imaging operations are performed while the multi-viewpoint camera 18 is rotated by 10 degrees at a time. Performing such imaging operations causes the image storage device 16 to store a 360-degree panoramic image. It should be noted that the smaller the rotation angle $\beta$ for the imaging operations, the more preferable parallax images can be supplied to the user.

The sensor information acquisition section 20 acquires the sensor information of the posture sensor 124 and supplies the acquired sensor information to the motion detection section 30. Further, the captured image acquisition section 22 acquires a captured image and supplies the acquired captured image to the motion detection section 30.

The motion detection section 30 detects the motion of the HMD 100 worn on the head of the user, and identifies the position coordinates and posture of the HMD 100. This process is performed to ensure that the viewing field to be displayed on the display panel 130 of the HMD 100 coordinates with the motion of the user's head. This head tracking process may be performed by using a well-known method.

The motion detection section 30 detects the position coordinates and posture of the HMD 100 from the sensor information of the posture sensor 124. The motion detection section 30 identifies the position coordinates of the HMD 100 from the sensor information of the three-axis acceleration sensor, and identifies the posture of the HMD 100 from the sensor information of the three-axis gyro sensor. The position coordinates are derived from a position coordinate in the pitch axis direction (X-coordinate), a position coordinate in the yaw axis direction (Y-coordinate), and a position coordinate in the roll axis direction (Z-coordinate) when the reference position is used as the origin. Further, the posture of the HMD 100 is derived from an angle around the pitch axis (pitch angle) with respect to the reference posture, an angle around the yaw axis (yaw angle) with respect to the reference posture, and an angle around the roll axis (roll angle) with respect to the reference posture.

It is preferable that the motion detection section 30 enhance the accuracy of detection of the position coordinates and posture by further using the result of imaging the light-emitting markers 110 for tracking. The motion detection section 30 detects the position coordinates and posture of the HMD 100 at predetermined intervals. If, for example, images are supplied to the HMD 100 at a frame rate of 60 fps, it is preferable that the motion detection section 30 execute a detection process at $\frac{1}{60}$-second intervals. The following describes a method that is used by the information processing device 10 to generate the parallax images in accordance with position information and posture regarding the HMD 100.

Based on the position information and posture regarding the HMD 100, which are detected by the motion detection 30, the status determination section 32 determines the viewpoint position, gaze direction, and binocular inclination angle of the user. In the embodiment, the user's viewpoint position is defined as the position of a central point between the left and right eyes. Further, the user's gaze direction is defined as a direction toward which the user faces with the user's viewpoint position defined as a starting point. Furthermore, the binocular inclination angle is defined as the angle between the horizontal plane and the line connecting the left and right eyes of the user.

The status determination section 32 determines the user's viewpoint position based on the position information regarding the HMD 100, and then determines the viewpoint position of the virtual camera 8 based on the determined user's viewpoint position. However, if the viewpoint position of the virtual camera 8 is fixed in the VR application, the viewpoint position of the virtual camera 8 may be set at a fixed position within the virtual cylindrical body. In this case, the viewpoint position of the virtual camera 8 is set at a predetermined position on the central axis line in the virtual cylindrical body (see FIG. 6).

The status determination section 32 determines the user's gaze direction based on the posture of the HMD 100. The status determination section 32 may directly determine the determined user's gaze direction as the gaze direction (optical axis direction) of the virtual camera 8, or may determine the gaze direction of the virtual camera 8 by performing a correction process. If stable sensor information is not supplied to the motion detection section 30 due, for instance, to a noise superimposed on the sensor information, the motion detection section 30 may erroneously detect a swinging motion of the user's head while the user's head is not moving. In such an instance, the status determination section 32 may smooth the motion detected by the motion detection section 30 for correction purposes, and determine the user's gaze direction and the gaze direction of the virtual camera 8.

In any case, the user's gaze direction corresponds to the gaze direction (optical axis direction) of the virtual camera 8 disposed in the virtual cylindrical body (see FIG. 6). The virtual camera 8 has a default baseline length of 20 mm.

Figure 10:
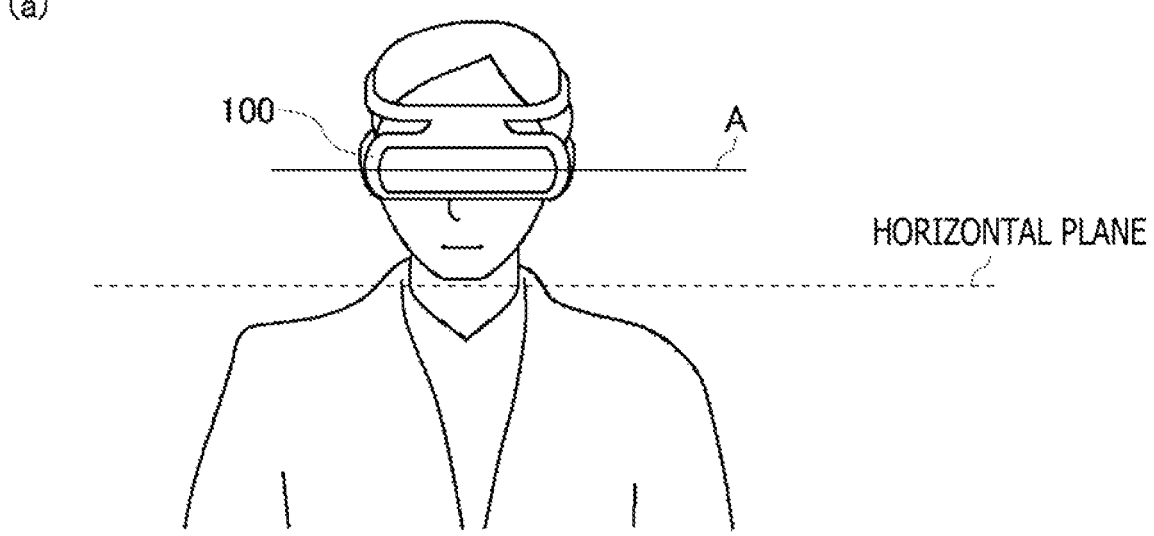
FIGS. 10(a) and 10(b) are diagrams illustrating a binocular inclination angle.
Figure 10:
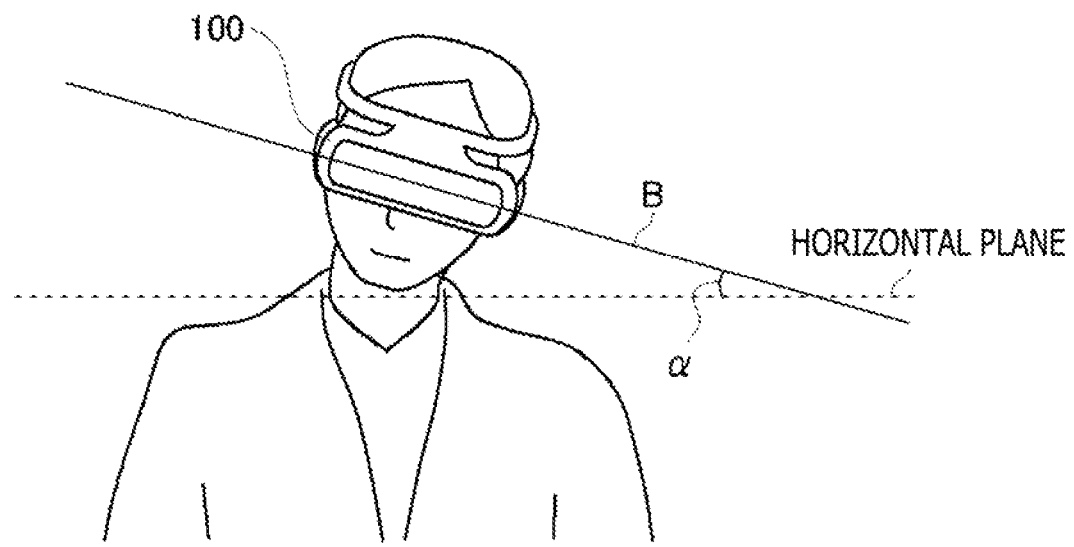

FIGS. 10(a) and 10(b) are diagrams illustrating the binocular inclination angle. It is presumed in FIGS. 10(a) and 10(b) that the user's gaze direction is parallel to the horizontal plane. The direction of the line connecting the left and right eyes of the user may be defined as the direction of housing width of the HMD 100.

FIG. 10(a) depicts the posture of the HMD 100 when the binocular inclination angle is zero. In this case, the user's head is not laterally tilted. Therefore, a line A connecting the left and right eyes of the user is parallel to the horizontal plane.

FIG. 10(b) depicts the posture of the HMD 100 when the binocular inclination angle is $\alpha$. When the user's head is laterally tilted, an angle is formed between the horizontal plane and the line connecting the left and right eyes. In the example of FIG. 10(b), the user's head is tilted leftward as viewed from the user so that an angle of $\alpha$ is formed between the horizontal plane and a line B connecting the left and right eyes. In this example, a binocular inclination angle of $\alpha$ is equivalent to the roll angle.

The following describes a method that is used by the image identification section 34 to identify two images for generating the left- and right-eye parallax images from a plurality of viewpoint images stored in the image storage device 16 in accordance with at least the user's gaze direction and binocular inclination angle determined by the status determination section 32.

As described above, the image storage device 16 stores a plurality of different multi-viewpoint images in association with gaze directions at the time of acquisition. In a case where the multi-viewpoint images are captured by the multi-viewpoint camera 18 at 0.1-degree intervals, 3600 different multi-viewpoint images are stored in the image storage device 16. Each multi-viewpoint image includes a plurality of viewpoint images, and each viewpoint image is stored in the image storage device 16 in association with a viewpoint position in two-dimensional coordinates that is set for each multi-viewpoint image.

From a plurality of different multi-viewpoint images acquired in different gaze directions, the image identification section 34 identifies multi-viewpoint images acquired in a gaze direction coinciding with the user's gaze direction. If, for example, the user's gaze direction in the status determination section 32 has a resolution of 0.1 degrees, and the image storage device 16 stores multi-viewpoint images acquired in a gaze direction spaced at 0.1-degree intervals, multi-viewpoint images acquired in a direction coinciding with the user's gaze direction are definitely stored. The following describes a case where multi-viewpoint images acquired in a gaze direction coinciding with the user's gaze direction are the multi-viewpoint images depicted in FIG. 5.

First of all, in a virtual two-dimensional coordinate plane of multi-viewpoint images acquired in a gaze direction coinciding with the user's gaze direction, the image identification section 34 determines coordinate values such that a gaze direction starting from the user's viewpoint position penetrates the two-dimensional coordinate plane of the multi-viewpoint images. The user's gaze direction is orthogonal to the two-dimensional coordinate plane.

Figure 11:
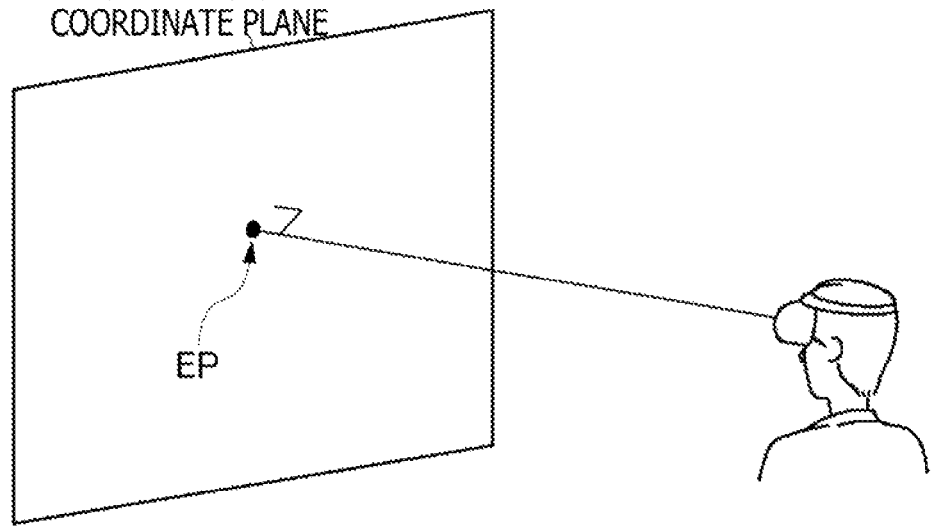
FIG. 11 is a diagram illustrating an intersection between a user's gaze direction and a two-dimensional coordinate plane.

FIG. 11 illustrates an intersection between the user's gaze direction and the two-dimensional coordinate plane. Coordinate values of the intersection represent the viewpoint position of the virtual camera 8 facing the two-dimensional coordinate plane, that is, the user's viewpoint position. A position represented by the coordinate values of the intersection between the two-dimensional coordinate plane and the user's gaze direction is hereinafter referred to as the user's "gaze direction position EP."

Figure 12:
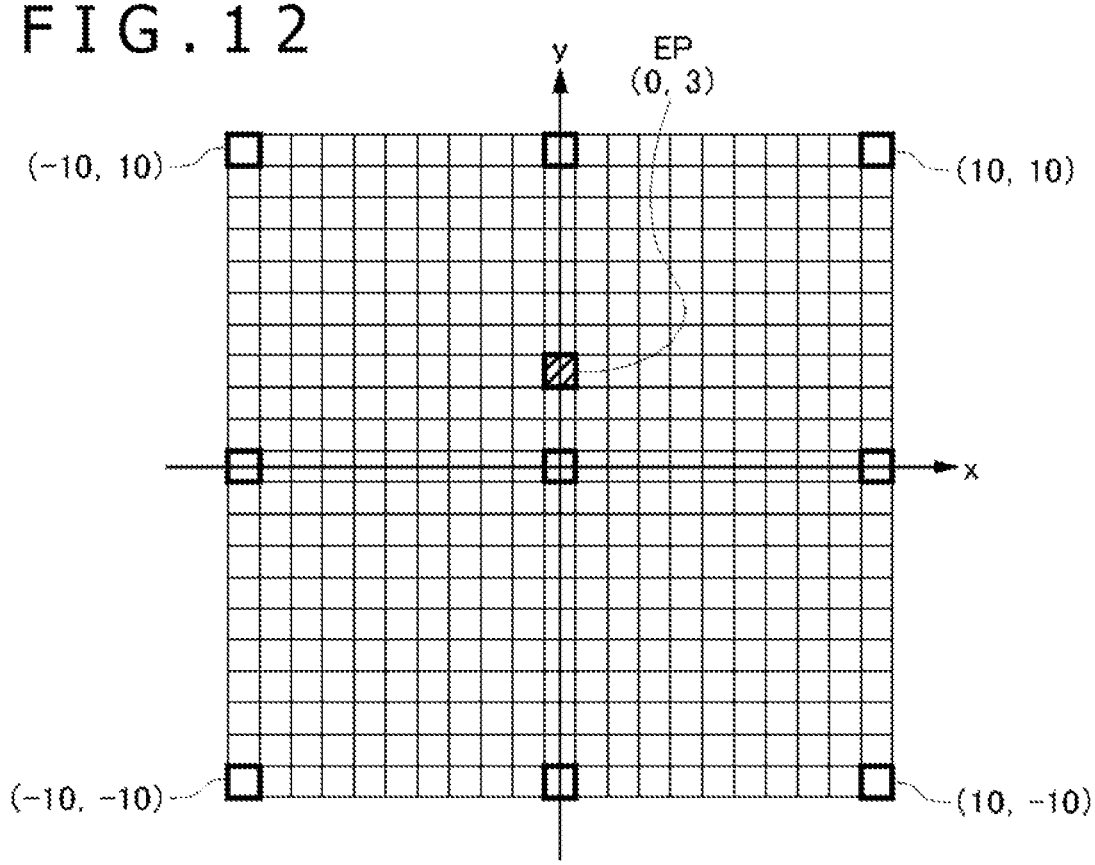
FIG. 12 is a diagram illustrating an example in which the position of the user's gaze direction in the two-dimensional coordinate plane is derived.

FIG. 12 illustrates an example in which the user's gaze direction position EP in the two-dimensional coordinate plane is derived. Here, the user's gaze direction position EP is derived as a position represented by the coordinate values (0,3) in the two-dimensional coordinate plane.

When the gaze direction position EP is identified, the image identification section 34 identifies two images for generating the left- and right-eye parallax images in accordance with the binocular inclination angle determined by the status determination section 32. A position represented by the coordinate values of a viewpoint image used for generating the left-eye image 5a is hereinafter referred to as the "left-eye image position LP," and a position represented by the coordinate values of a viewpoint image used for generating the right-eye image 5b is hereinafter referred to as the "right-eye image position RP."

Figure 13:
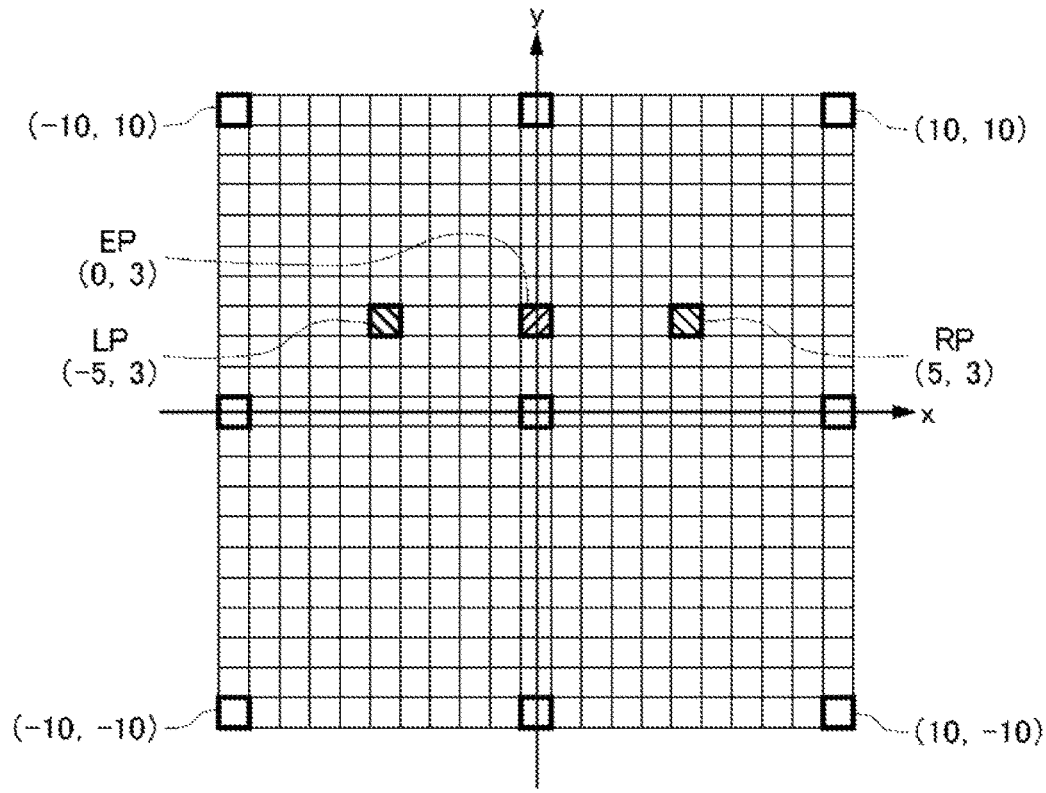
FIGS. 13(a) and 13(b) are diagrams illustrating examples of left- and right-eye image positions.
Figure 13:
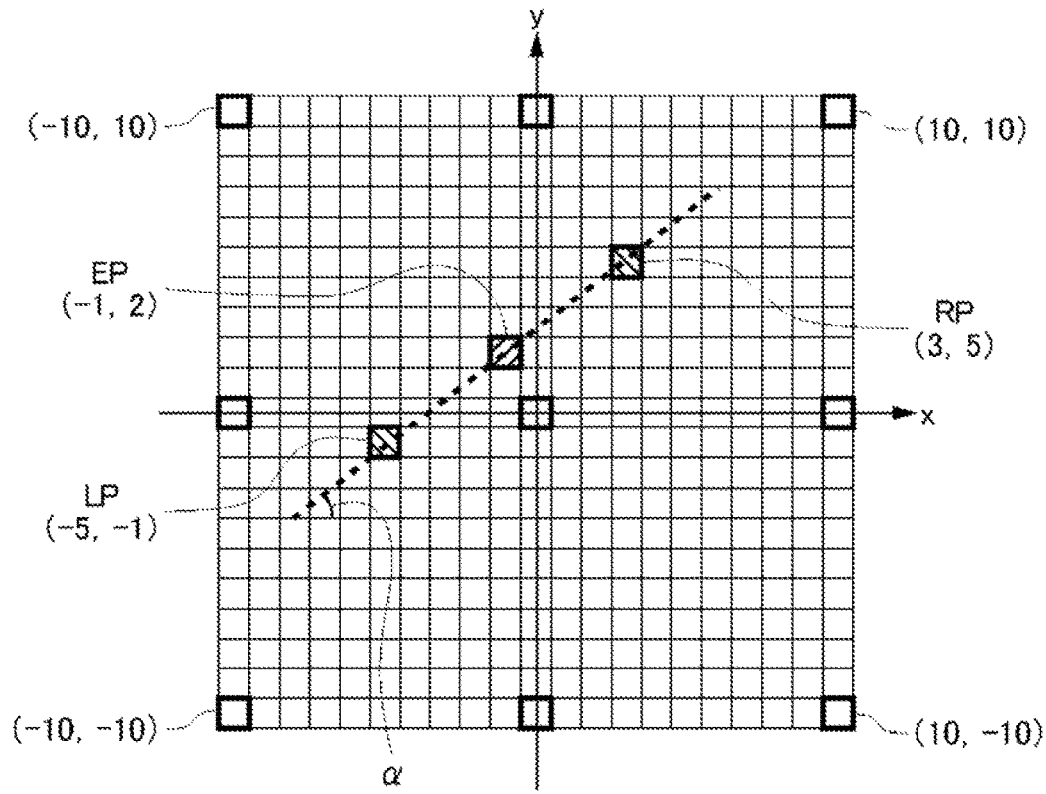

FIG. 13(a) illustrates an example of an identified left-eye image position LP and an identified right-eye image position RP. FIG. 13(a) depicts the left-eye image position LP and right-eye image position RP that are identified when the user's head is not tilted laterally as depicted in FIG. 10(a).

The image identification section 34 identifies two images that are positioned at the same distance from the gaze direction position EP in a direction along the binocular inclination angle, and are disposed in such a manner that the distance between the viewpoint positions of the two images is equal to a preset distance. That is to say, the image identification section 34 determines the left-eye image position LP and the right-eye image position RP with reference to the gaze direction position EP in such a manner that the left-eye image position LP, the gaze direction position EP, and the right-eye image position RP are lined up straight, and that the distance from the gaze direction position EP to the left-eye image position LP is equal to the distance from the gaze direction position EP to the right-eye image position RP.

Here, the preset distance between the left-eye image position LP and the right-eye image position RP corresponds to the baseline length of the virtual camera 8, that is, the distance between the left camera and the right camera. In the embodiment, the virtual camera 8 has a default baseline length of 20 mm. Therefore, the image identification section 34 determines the left-eye image position LP and the right-eye image position RP in such a manner that the parallax between the left- and right-eye image is 20 mm. In the present example, the binocular inclination angle, which is the angle between the horizontal plane and the line connecting the left and right eyes of the user, is zero. Therefore, the left-eye image position LP is identified as a position represented by the coordinates (−5,3), and the right-eye image position RP is identified as a position represented by the coordinates (5,3).

FIG. 13(b) illustrates another example of the identified left-eye image position LP and right-eye image position RP. FIG. 13(b) depicts the left-eye image position LP and right-eye image position RP that are identified when the user's head is tilted laterally as depicted in FIG. 10(b). The example of FIG. 13(b) indicates a case where the user in a state depicted in FIG. 10(a) tilts his/her head leftward as depicted in FIG. 10(b). Therefore, the gaze direction position EP moves counterclockwise from the coordinates (0,3) to the coordinates (−1,2).

The image identification section 34 identifies two images that are positioned at the same distance from the gaze direction position EP in a direction along the binocular inclination angle, and are disposed in such a manner that the distance between the viewpoint positions of the two images is equal to a preset distance. In the present example, the result of identification indicates that the binocular inclination angle is α, and that the left-eye image position LP is represented by the coordinates (−5,−1), and further that the right-eye image position RP is represented by the coordinates (3,5).

In the embodiment, the left-eye image position LP and the right-eye image position RP are derived by using the following parameters:

Parameters

Gaze direction position EP: (x0,y0)
Preset parallax distance: ipd
Binocular inclination angle: α
Inter-image distance in two-dimensional coordinates: s The x-direction parallax between the left-eye image position LP and the right-eye image position RP is ipd×cos(α), and the y-direction parallax between the left-eye image position LP and the right-eye image position RP is ipd×sin(α). Therefore, the following equations can be used for derivation:

Coordinates of left-eye image position $LP=\{(x0−(ipd/s)\times\cos(\alpha)/2), (y0−(ipd/s)\times\sin(\alpha)/2)\}$ Coordinates of right-eye image position $RP=\{(x0+(ipd/s)\times\cos(\alpha)/2),(y0+(ipd/s)\times\sin(\alpha)/2)\}$ In the embodiment, ipd=20 mm and s=2 mm. Therefore, the following expressions can be used:

Coordinates of left-eye image position $LP=\{x0−5\times\cos(\alpha),y0−5\times\sin(\alpha)\}$ Coordinates of right-eye image position $RP=\{x0+5\times\cos(\alpha),y0+5\times\sin(\alpha)\}$ It is preferable that the preset parallax distance ipd be freely changeable by the user. Referring to FIG. 9, the reception section 24 is able to receive the preset distance specified by the user. When the reception section 24 receives the specified preset distance, the image identification section 34 changes the preset distance in accordance with the specification received by the reception section 24. A change in the preset distance is equivalent to a change in the ipd parameter value of the derivation equations.

As described above, the image identification section 34 identifies multi-viewpoint images serving as materials for parallax images from a plurality of different multi-viewpoint images stored in the image storage device 16 in accordance with the user's gaze direction, and further identifies two images for use in the generation of parallax images in accordance with the binocular inclination angle from a plurality of viewpoint images included in the identified multi-viewpoint images. In the example illustrated, for instance, in FIG. 13(a), the image identification section 34 decides to use a viewpoint image associated with the coordinates (−5,3) for the generation of the left-eye image 5a and use a viewpoint image associated with the coordinates (5,3) for the generation of the right-eye image 5b. Further, in the example illustrated in FIG. 13(b), the image identification section 34 decides to use a viewpoint image associated with the coordinates (−5,−1) for the generation of the left-eye image 5a and use a viewpoint image associated with the coordinates (3,5) for the generation of the right-eye image 5b.

The image generation section 36 generates left- and right-eye parallax images from the two viewpoint images identified by the image identification section 34. In this instance, the image generation section 36 generates parallax images by adjusting the angles of the two images in accordance with the binocular inclination angle.

When the binocular inclination angle is not zero, that is, when the user's head is tilted laterally, the top-to-bottom direction of the left-eye display panel 130a and right-eye display panel 130b is tilted from the vertical direction. Therefore, when the top-to-bottom direction of the left-eye display panel 130a and right-eye display panel 130b is adjusted to coincide with the top-to-bottom direction of a displayed image, an image tilted by the binocular inclination angle α is visible to the user's eyes.

Accordingly, the image generation section 36 generates the left-eye image 5a and the right-eye image 5b by rotating the two viewpoint images identified by the image identification section 34 through an angle of −α and cutting out angle-of-view images of the left-eye display panel 130a and right-eye display panel 130b from the viewpoint images rotated through an angle of −α. That is to say, the image generation section 36 adjusts the angles of the two viewpoint images so that the top-to-bottom direction of images displayed on the left-eye display panel 130a and the right-eye display panel 130b coincides with the actual top-to-bottom direction.

Viewpoint images stored in the image storage device 16 have a larger angle of view than the images to be displayed on the left-eye display panel 130a and the right-eye display panel 130b. Therefore, the left-eye image 5a and right-eye image 5b corresponding to the angles of view of the left-eye display panel 130a and right-eye display panel 130b can be cut out from the viewpoint images rotated through an angle of −α. It should be noted that image light from the display panels 130 reaches the user's eyes through the optical lenses. Therefore, it is preferable that the image generation section 36 generate parallax images after correcting distortion caused by passage through the optical lenses.

When the image generation section 36 generates the parallax images, the image supply section 38 supplies the parallax images to the HMD 100. The control section 120 in the HMD 100 causes the left-eye display panel 130a to display a left-eye image and causes the right-eye display panel 130b to display a right-eye image. This enables the user to view the parallax images displayed on the left-eye display panel 130a and the right-eye display panel 130b.

As described above, even when the left and right eyes of the user differ in horizontal height, the information processing device 10 is able to supply appropriate parallax images to the HMD 100 by generating parallax images from a plurality of viewpoint images included in the multi-viewpoint images. In the embodiment, the image storage device 16 stores, as the viewpoint images, a plurality of actual viewpoint images captured by the cameras 19 and a plurality of interpolated images generated from at least two actual viewpoint images by the interpolation process. Therefore, the image identification section 34 selects two images for use in the generation of parallax images from the actual viewpoint images and the interpolated images (virtual viewpoint images).

In another example, the image storage device 16 stores only the actual viewpoint images captured by the cameras 19 as the viewpoint images. In this instance, the image identification section 34 may generate two images for use in the generation of the left- and right-eye parallax images from the actual viewpoint images stored in the image storage device 16 by performing a real-time interpolation process based on the user's gaze direction and binocular inclination angle determined by the image identification section 34. This provides an advantage in that a large number of interpolated images need not be generated in advance.

For the real-time interpolation process, the image storage device 16 may store a plurality of actual viewpoint images and some interpolated images. The some interpolated images are used to promptly generate virtual viewpoint images having desired coordinate values, and may be, for example, interpolated images positioned midway between two actual viewpoint images. When the interpolation process is to be performed in real time as described above, a way of increasing the speed of the interpolation process may devised.

The above-described process is performed in a case where the image identification section 34 identifies, from a plurality of different multi-viewpoint images, multi-viewpoint images captured in the same gaze direction as the user's gaze direction. When the user's gaze direction has a resolution of 0.1 degrees and the image storage device 16 stores multi-viewpoint images acquired in a gaze direction spaced at 0.1-degree intervals, the image identification section 34 is able to identify multi-viewpoint images captured in the same gaze direction as the user's gaze direction.

Meanwhile, when the multi-viewpoint images are captured in a gaze direction spaced at small angular intervals, there may be a case where no multi-viewpoint images match the user's gaze direction. A process performed in such a case is described below.

Figure 14:
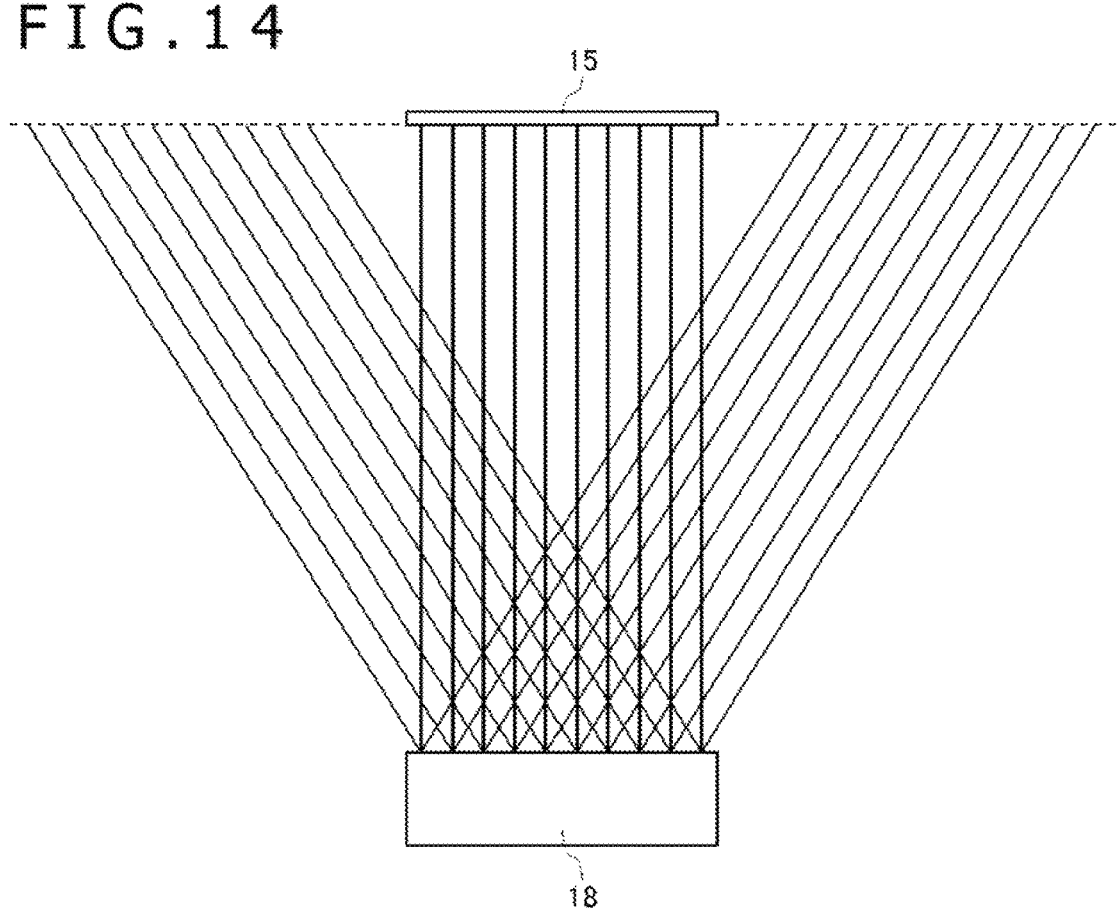
FIG. 14 is a diagram illustrating the gaze direction and angle-of-view of multi-viewpoint images.

FIG. 14 is a diagram illustrating the gaze direction and angle-of-view of multi-viewpoint images. FIG. 14 illustrates the gaze direction and angle-of-view of actual viewpoint images captured from above by the multi-viewpoint camera 18 and of virtual viewpoint images (interpolated images). Individual viewpoint images are obtained by imaging an object at a predetermined angle of view around individual gaze directions. It should be noted that FIG. 14 depicts ten different gaze directions for the sake of convenience. In reality, however, twenty-one gaze directions are laterally arrayed as described in conjunction with the embodiment. A two-dimensional coordinate plane 15 is a virtual two-dimensional plane for expressing a viewpoint position for each viewpoint image. The distance between the multi-viewpoint camera 18 and the two-dimensional coordinate plane 15 corresponds to the radius of the virtual cylindrical body.

Figure 15:
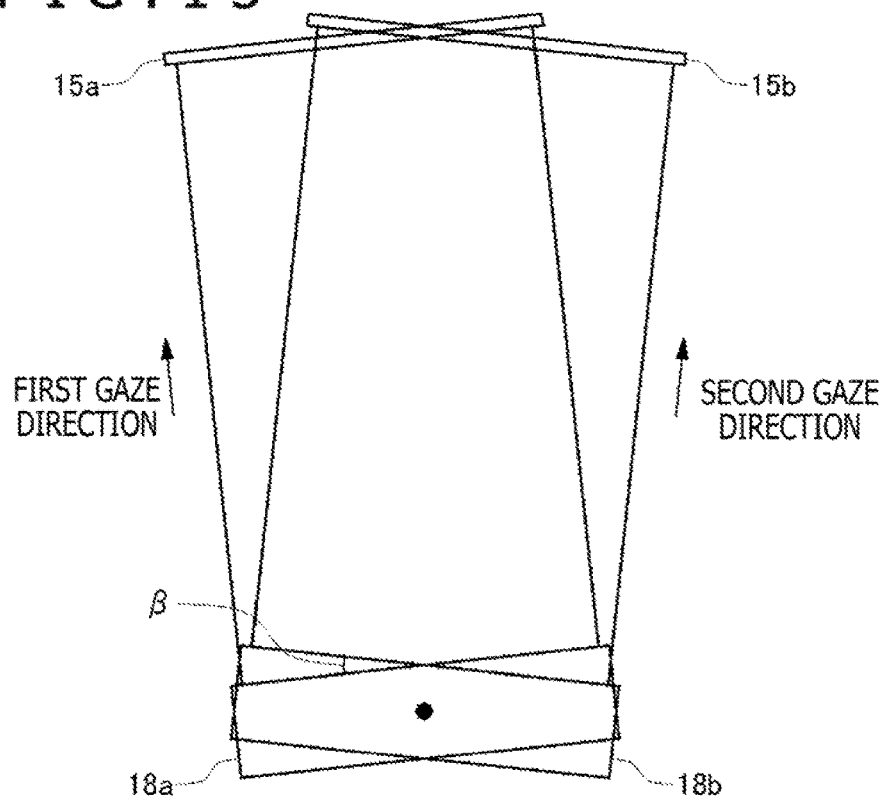
FIG. 15 is a diagram illustrating the relationship between two-dimensional coordinate planes of multi-viewpoint images.

FIG. 15 is a diagram illustrating the relationship between two-dimensional coordinate planes 15 of multi-viewpoint images that are captured by rotating the multi-viewpoint camera 18 through a predetermined angle of R. Here, the multi-viewpoint camera 18a captures an object image in a first gaze direction, and the multi-viewpoint camera 18b captures the object image in a second gaze direction. The first gaze direction of the multi-viewpoint camera 18a and the second gaze direction of the multi-viewpoint camera 18b differ by an angle of β.

In the above-described embodiment, the image identification section 34 selects multi-viewpoint images acquired in the same gaze direction as the user's gaze direction, and then identifies two viewpoint images for forming parallax images from the selected multi-viewpoint images. As regards the multi-viewpoint images depicted, for example, in FIG. 15, the image identification section 34 selects multi-viewpoint images captured by the multi-viewpoint camera 18a when the user's gaze direction coincides with the first gaze direction, and selects multi-viewpoint images captured by the multi-viewpoint camera 18b when the user's gaze direction coincides with the second gaze direction.

The following describes how the image identification section 34 selects multi-viewpoint images in a case where the vector of the user's gaze direction exists between the vector of the first gaze direction and the vector of the second gaze direction. More precisely, the following describes how the image identification section 34 selects multi-viewpoint images in a case where the vector of the user's gaze direction is projected onto a plane defined by the vector of the first gaze direction and the vector of the second gaze direction, and then the direction of the projected vector is between the first gaze direction and the second gaze direction.

Figure 16:
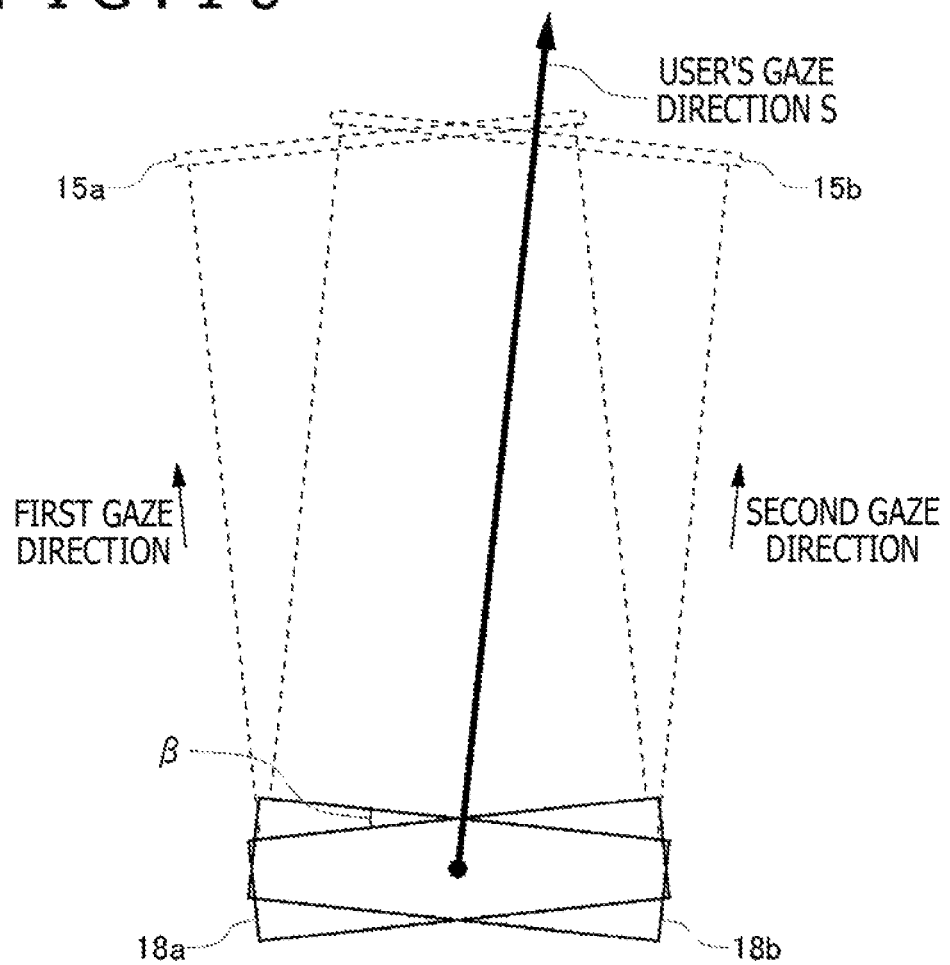
FIG. 16 is a diagram illustrating an exemplary user's gaze direction.

FIG. 16 illustrates an exemplary user's gaze direction S. In FIG. 16, the user's gaze direction S is such that the rotation center of the multi-viewpoint cameras 18 is the viewpoint position (starting point). However, the viewpoint position is not limited to such a position.

In a case where the user's gaze direction S does not coincide with the first gaze direction and with the second gaze direction, the image identification section 34 identifies at least two images for use in the generation of the left- and right-eye parallax images from a plurality of viewpoint images acquired in the first gaze direction and/or a plurality of viewpoint images acquired in the second gaze direction in accordance with the user's gaze direction and binocular inclination angle determined by the status determination section 32.

As an example, the image identification section 34 may compare the angle A1 between the first gaze direction and the user's gaze direction S with the angle A2 between the second gaze direction and the user's gaze direction S, and select multi-viewpoint images closer in direction to the user's gaze direction S, that is, multi-viewpoint images having a relatively small angle. If, for example, the angle A1 is larger than the angle A2, the image identification section 34 decides to identify two images for use in the generation of parallax images by using a second image group including a plurality of parallax images acquired in the second gaze direction. If, by contrast, the angle A2 is larger than the angle A1, the image identification section 34 decides to identify two images for use in the generation of parallax images by using a first image group including a plurality of parallax images acquired in the first gaze direction. As described above, based on the user's gaze direction S, the image identification section 34 may decide to identify two images by using either the first image group including the viewpoint images acquired in the first gaze direction or the second image group including the viewpoint images acquired in the second gaze direction.

It should be noted that the two-dimensional coordinate plane 15 is not orthogonal to the user's gaze direction S no matter which of the first and second image groups is used. Therefore, based on the user's gaze direction S, the image generation section 36 needs to perform a projective transformation on the image group to be used.

As another example, the image identification section 34 may identify at least two images for use in the generation of parallax images by using both the first image group including the viewpoint images acquired in the first gaze direction and the second image group including the viewpoint images acquired in the second gaze direction.

Figure 17:
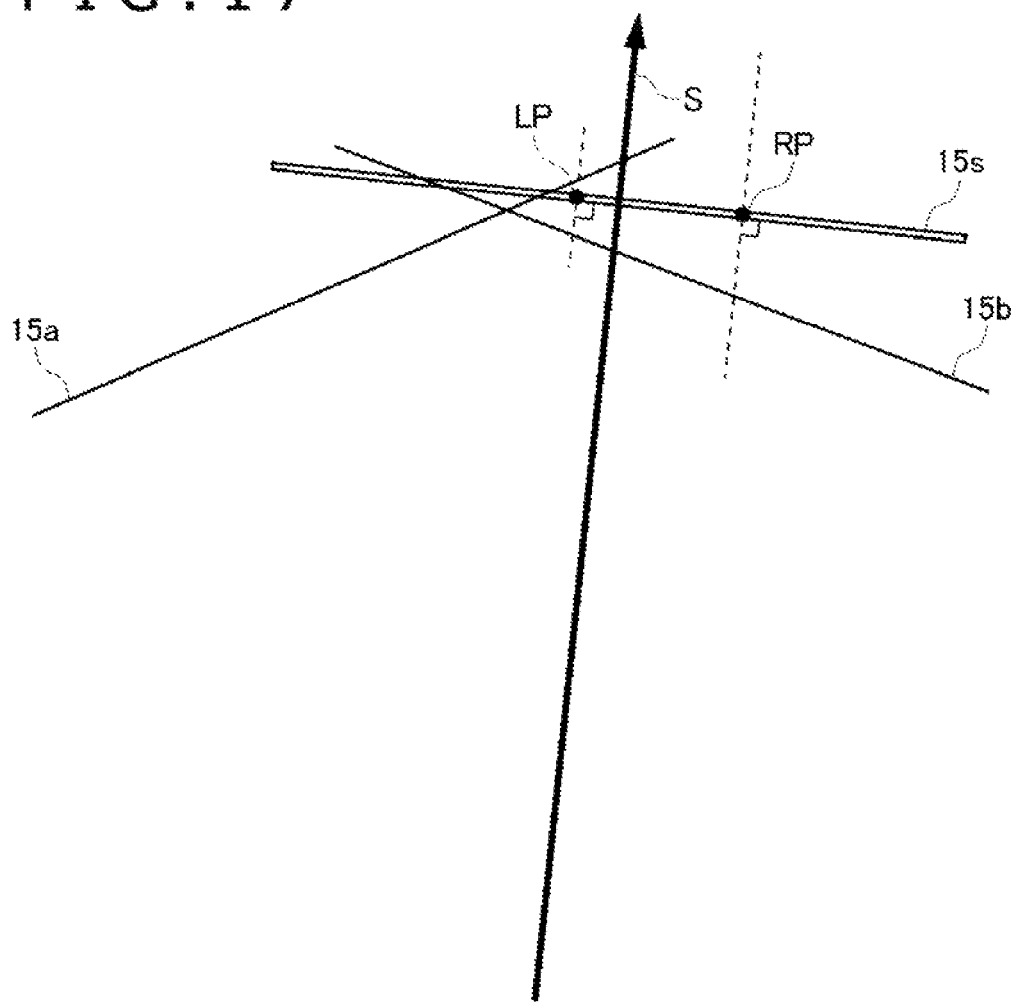
FIG. 17 is a diagram illustrating an example in which parallax images are generated by using both a first image group and a second image group.

FIG. 17 is a diagram illustrating an example in which parallax images are generated by using both the first image group and the second image group. FIG. 17 depicts the positional relationship between a two-dimensional coordinate plane 15a, a two-dimensional coordinate plane 15b, and the user's gaze direction S. A two-dimensional coordinate plane 15s is a virtual plane orthogonal to the user's gaze direction.

Here, it is assumed that the left-eye image position LP and right-eye image position RP in the two-dimensional coordinate plane 15s are identified by the image identification section 34. When lines orthogonal to the two-dimensional coordinate plane 15s are drawn from the left-eye image position LP and the right-eye image position RP, and the orthogonal lines intersect the two-dimensional coordinate plane 15a and the two-dimensional coordinate plane 15b, viewpoint images associated with the intersections can be used to generate the parallax images.

In the example of FIG. 17, the orthogonal line passing through the left-eye image position LP intersects the two-dimensional coordinate plane 15a and the two-dimensional coordinate plane 15b. Meanwhile, the orthogonal line passing through the right-eye image position RP intersects the two-dimensional coordinate plane 15b, but does not intersect the two-dimensional coordinate plane 15a. This signifies that a viewpoint image associated with the right-eye image position RP in the two-dimensional coordinate plane 15s does not exist in the two-dimensional coordinate plane 15a. It should be noted that FIG. 17 depicts the relationship between the two-dimensional coordinate planes 15 in a one-dimensional manner. In reality, however, the intersections are determined in a two-dimensional manner.

The image generation section 36 is capable of combining a viewpoint image acquired in the first gaze direction with a viewpoint image acquired in the second gaze direction. Before this combination, a projective transformation is performed on each viewpoint image in accordance with the user's gaze direction S. In the example of FIG. 17, the image generation section 36 combines a viewpoint image acquired in the first gaze direction with a viewpoint image acquired in the second gaze direction for the purpose of generating the left-eye image 5a. As two viewpoint images are used to generate the left-eye image 5a, image reproduction can be performed with increased accuracy. For the purpose of generating the right-eye image 5b, the image generation section 36 generates the right-eye image 5b from a viewpoint image in the second gaze direction because there is no viewpoint image in the first gaze direction.

The present invention has been described based on an embodiment. It is to be understood by those skilled in the art that the embodiment is illustrative, and that a combination of the elements and processes described in conjunction with the embodiment can be variously modified, and further that such modifications can be made without departing from the spirit and scope of the present invention.

The embodiment has been described on the assumption that the user's gaze direction is parallel to the horizontal plane. However, the present invention is not limited to such a case. As is the case with a process that is performed in the embodiment when the user's gaze direction does not coincide with the gaze direction of multi-viewpoint images, if viewpoint images are acquired in a gaze direction parallel to the horizontal plane and the user's gaze direction is not parallel to the horizontal plane, the image generation section 36 is able to perform a projective transformation on the viewpoint images in order to equalize the gaze direction for image acquisition with the user's gaze direction and generate suitable parallax images.

REFERENCE SIGNS LIST

1 Information processing system, 10 Information processing device, 12 Processing device, 14 Output control device, 16 Image storage device, 20 Sensor information acquisition section, 22 Captured image acquisition section, 24 Reception section; 30 Motion detection section, 32 Status determination section, 34 Image identification section, 36 Image generation section, 38 Image supply section

INDUSTRIAL APPLICABILITY

The present invention is applicable to a technical field where images to be displayed on a head-mounted display are generated.

The invention claimed is:
1. An information processing device comprising:
  a detection section that detects the posture of a head-mounted display worn on the head of a user;
  a status determination section that determines a user's gaze direction and a binocular inclination angle in accordance with the posture of the head-mounted display that is detected by the detection section, the binocular inclination angle being the angle between a horizontal plane and a line connecting the left and right eyes of the user;

an image identification section that identifies two images for use in the generation of left-eye and right-eye parallax images from a plurality of viewpoint images in accordance with the user's gaze direction and the binocular inclination angle that are determined by the status determination section, wherein the plurality of viewpoint images are arranged in a 3×3 or greater rectangular grid, and wherein the left-eye parallax image is selected based on a distance from a left-eye gaze point to a first gaze point image, and wherein the right-eye parallax image is selected based on a distance from a right-eye gaze point to a second image from the plurality of viewpoint images;

an image generation section that generates the left-eye and right-eye parallax images from the two images identified by the image identification section; and an image supply section that supplies the parallax images generated by the image generation section to the head-mounted display.

2. The information processing device according to claim 1, wherein
the image generation section generates the parallax images by adjusting the angles of the two images in accordance with the binocular inclination angle.

3. The information processing device according to claim 1, wherein
the viewpoint images are stored in an image storage device.

4. The information processing device according to claim 3, wherein
the image storage device stores each of the viewpoint images in association with a viewpoint position.

5. The information processing device according to claim 4, wherein
the image identification section identifies two images whose viewpoint positions are apart from each other by a preset distance.

6. The information processing device according to claim 5, wherein
the image identification section identifies a user's gaze direction position in two-dimensional coordinates, and identifies two images that are positioned at the same distance from the user's gaze direction position in a direction along the binocular inclination angle and are disposed in such a manner that the distance between the viewpoint positions of the two images is equal to the preset distance.

7. The information processing device according to claim 5, further comprising:
a reception section that receives the preset distance specified by the user;
wherein
the image identification section changes the preset distance in accordance with the specified preset distance received by the reception section.

8. The information processing device according to claim 3, wherein
the image storage device stores, as a plurality of viewpoint images, a plurality of actual viewpoint images captured by a camera and a plurality of interpolated images, the interpolated images being generated by performing an interpolation process on at least two actual viewpoint images to form the rectangular grid; and wherein the image identification section selects two images for use in the generation of parallax images from the actual viewpoint images and the interpolated images.

9. The information processing device according to claim 3, wherein
the image storage device stores a plurality of actual viewpoint images captured by the camera; and wherein
the image identification section generates two images for use in the generation of left-eye and right-eye parallax images by performing the interpolation process on the actual viewpoint images stored in the image storage device in accordance with the user's gaze direction and binocular inclination angle determined by the status determination section.

10. An image generation method comprising:
detecting the posture of a head-mounted display worn on the head of a user;
determining a user's gaze direction and a binocular inclination angle in accordance with the detected posture of the head-mounted display, the binocular inclination angle being the angle between a horizontal plane and a line connecting the left and right eyes of the user;
identifying two images for use in the generation of left- and right-eye parallax images from a plurality of viewpoint images in accordance with the user's gaze direction and the binocular inclination angle,
wherein the plurality of viewpoint images are arranged in a 3×3 or greater rectangular grid, and
wherein the left-eye parallax image is selected based on a distance from a left-eye gaze point to a first gaze point image, and
wherein the right-eye parallax image is selected based on a distance from a right-eye gaze point to a second image from the plurality of viewpoint images;
generating the left- and right-eye parallax images from the two identified images; and
supplying the generated parallax images to the head-mounted display.

11. An information processing device comprising:
a detection section that detects the posture of a head-mounted display worn on the head of a user;
a status determination section that determines a user's gaze direction and a binocular inclination angle in accordance with the posture of the head-mounted display that is detected by the detection section, the binocular inclination angle being the angle between a horizontal plane and a line connecting the left and right eyes of the user;
an image identification section that identifies at least two images for use in the generation of left- and right-eye parallax images from a plurality of viewpoint images acquired in a first gaze direction and/or a plurality of viewpoint images acquired in a second gaze direction in accordance with the user's gaze direction and the binocular inclination angle that are determined by the status determination section,
wherein the plurality of viewpoint images are arranged in a 3×3 or greater rectangular grid, and
wherein the left-eye parallax image is selected based on a distance from a left-eye gaze point to a first gaze point image, and wherein the right-eye parallax image is selected based on a distance from a right-eye gaze point to a second image from the plurality of viewpoint images;

an image generation section that generates the left- and right-eye parallax images from at least the two images identified by the image identification section; and an image supply section that supplies the parallax images generated by the image generation section to the head-mounted display.

12. The information processing device according to claim 11, wherein when the vector of the user's gaze direction is projected onto a plane defined by the vector of the first gaze direction and the vector of the second gaze direction, the direction of the projected vector is between the first gaze direction and the second gaze direction.

13. The information processing device according to claim 11, wherein the image identification section decides, based on the user's gaze direction, to identify the two images by using either a first image group or a second image group, the first image group including a plurality of viewpoint images acquired in the first gaze direction, the second image group including a plurality of viewpoint images acquired in the second gaze direction.

14. The information processing device according to claim 11, wherein the image identification section identifies at least two images for use in the generation of parallax images by using both the first image group and the second image group, the first image group including a plurality of viewpoint images acquired in the first gaze direction, the second image group including a plurality of viewpoint images acquired in the second gaze direction.

15. The information processing device according to claim 14, wherein the image generation section combines a viewpoint image acquired in the first gaze direction with a viewpoint image acquired in the second gaze direction.

16. An image generation method comprising:

detecting the posture of a head-mounted display worn on the head of a user;

determining a user's gaze direction and a binocular inclination angle in accordance with the detected posture of the head-mounted display, the binocular inclination angle being the angle between a horizontal plane and a line connecting the left and right eyes of the user;

identifying at least two images for use in the generation of left- and right-eye parallax images from a plurality of viewpoint images acquired in a first gaze direction and/or a plurality of viewpoint images acquired in a second gaze direction in accordance with the user's gaze direction and the binocular inclination angle, wherein the plurality of viewpoint images are arranged in a 3×3 or greater rectangular grid, and wherein the left-eye parallax image is selected based on a distance from a left-eye gaze point to a first gaze point image, and wherein the right-eye parallax image is selected based on a distance from a right-eye gaze point to a second image from the plurality of viewpoint images; and generating the left- and right-eye parallax images from at least the two identified images.

* * * * *